(12) United States Patent
Park et al.

(10) Patent No.: US 12,062,127 B2
(45) Date of Patent: Aug. 13, 2024

(54) WEARABLE ELECTRONIC DEVICE CONTROLLING NOISE CANCELING OF EXTERNAL WEARABLE ELECTRONIC DEVICE AND METHOD OF OPERATING THE SAME

(71) Applicant: Samsung Electronics Co., Ltd., Gyeonggi-do (KR)

(72) Inventors: Jeongwon Park, Gyeonggi-do (KR); Chulkwi Kim, Gyeonggi-do (KR); Seungnyun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 17/569,599

(22) Filed: Jan. 6, 2022

(65) Prior Publication Data

US 2022/0328030 A1 Oct. 13, 2022

Related U.S. Application Data

(63) Continuation of application No. PCT/KR2021/020316, filed on Dec. 30, 2021.

(30) Foreign Application Priority Data

Apr. 13, 2021 (KR) .................. 10-2021-0048034

(51) Int. Cl.
*G06T 15/00* (2011.01)
*G06F 3/01* (2006.01)
*G10K 11/178* (2006.01)

(52) U.S. Cl.
CPC ............ *G06T 15/005* (2013.01); *G06F 3/012* (2013.01); *G06F 3/013* (2013.01); *G06F 3/017* (2013.01); *G10K 11/17873* (2018.01)

(58) Field of Classification Search
CPC .......... G02B 2027/0187; G02B 27/017; G06F 3/011; G06F 3/012; G06F 3/013;
(Continued)

(56) References Cited

U.S. PATENT DOCUMENTS 11,114,082 B1 * 9/2021 Carlsson .......... G10K 11/17857
2012/0162259 A1 6/2012 Sakai
(Continued)

FOREIGN PATENT DOCUMENTS

JP 2012-133250 A 7/2012
JP WO2015/068587 A1 5/2015
(Continued)

OTHER PUBLICATIONS

International Search Report Dated Apr. 11, 2022.
European Extended Search Report dated Jun. 6, 2024.

*Primary Examiner* — Ming Wu
(74) *Attorney, Agent, or Firm* — Cha & Reiter, LLC

(57) ABSTRACT

According to certain embodiments, an electronic device comprises: at least one display module; at least one communication module; at least one microphone; at least one camera; and a processor, wherein the processor is configured to: capture at least one image through the at least one camera, identify at least one object located around the electronic device, based at least in part on the at least one image, identify sound information attributable to the identified at least one object from first sound data input through the at least one microphone, control the at least one display module to display at least one virtual object corresponding to the identified at least one object at a position corresponding to the at least one object, wherein the position is determined based on the sound information, obtain a first user input associated with a first virtual object among the at least one virtual object, and determine a noise cancellation (Continued)

(NC) level of a first object corresponding to the first virtual object, based on the first user input.

20 Claims, 18 Drawing Sheets

(58) Field of Classification Search
CPC ....... G06F 3/017; G06T 15/005; G06T 19/00; G10K 11/17821; G10K 11/17837; G10K 11/17857; G10K 11/17873; G10K 11/17881; G10K 2210/108; G10K 2210/111; H04R 1/10; H04R 1/22; H04R 1/32
See application file for complete search history.

(56) References Cited

U.S. PATENT DOCUMENTS

| | | |
|---|---|---|
| 2014/0172421 A1 | 6/2014 | Liu et al. |
| 2016/0239252 A1 | 8/2016 | Nakagawa et al. |
| 2016/0379660 A1 | 12/2016 | Wright et al. |
| 2017/0345408 A1 | 11/2017 | Hong et al. |
| 2019/0026071 A1 | 1/2019 | Tamaoki et al. |
| 2020/0135163 A1 | 4/2020 | Lovitt et al. |
| 2020/0265860 A1 | 8/2020 | Mouncer et al. |
| 2020/0296521 A1 | 9/2020 | Wexler et al. |
| 2021/0099146 A1* | 4/2021 | Lee .......................... G06T 7/73 |
| 2021/0375257 A1* | 12/2021 | Tajik ....................... G10L 25/57 |
| 2021/0399911 A1* | 12/2021 | Jorasch ............... H04L 12/1822 |

FOREIGN PATENT DOCUMENTS

| | | |
|---|---|---|
| JP | 2017-184048 A | 10/2017 |
| JP | 2019-33426 A | 2/2019 |
| KR | 10-2013-0101152 A | 9/2013 |
| KR | 10-2016-0055023 A | 5/2016 |
| KR | 10-2017-0069790 A | 6/2017 |
| KR | 10-1756674 B1 | 7/2017 |
| KR | 10-2017-0099088 A | 8/2017 |
| KR | 10-2021-0037886 A | 4/2021 |

* cited by examiner

| LEVEL | NC LEVELS | OPERATIONS |
|---|---|---|
| LEVEL 4 | 101~150 | HEARING AID OPERATION |
| LEVEL 3 | 100 | DEACTIVATE NC FUNCTION |
| LEVEL 2 | 1~99 | ADJUST VOLUME |
| LEVEL 1 | 0 | COMPLETELY BLOCK NOISE |

WEARABLE ELECTRONIC DEVICE CONTROLLING NOISE CANCELING OF EXTERNAL WEARABLE ELECTRONIC DEVICE AND METHOD OF OPERATING THE SAME

CROSS-REFERENCE TO RELATED APPLICATION(S)

This application is a continuation of International Application No. PCT/KR2021/020316 designating the United States, filed on Dec. 30, 2021, in the Korean Intellectual Property Receiving Office and claiming priority to Korean Patent Application No. 10-2021-0048034, filed on Apr. 13, 2021, in the Korean Intellectual Property Office, the disclosures of which are incorporated by reference herein in their entireties.

BACKGROUND

1. Field

Certain embodiments of the disclosure relate to a wearable electronic device for controlling noise canceling of an external wearable electronic device, and a method of operating the same.

2. Description of Related Art

Augmented reality (AR) makes it possible for the user to see a real environment, and providing a better sense of reality through additional information. The user can observe the image together with a real environment to identify, for example, information about an object in the currently observed environment.

An AR device may be a wearable electronic device. For example, an electronic device in the form of AR glasses that can be worn on the face like glasses is becoming widespread.

However, the sound on an AR device often includes a mixture of virtual sounds and ambient noise. The ambient noise can be distracting and deteriorate the user experience.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device comprises: at least one display module; at least one communication module; at least one microphone; at least one camera; and a processor, wherein the processor is configured to: capture at least one image through the at least one camera, identify at least one object located around the electronic device, based at least in part on the at least one image, identify sound information attributable to the identified at least one object from first sound data input through the at least one microphone, control the at least one display module to display at least one virtual object corresponding to the identified at least one object at a position corresponding to the at least one object, wherein the position is determined based on the sound information, obtain a first user input associated with a first virtual object among the at least one virtual object, and determine a noise cancellation (NC) level of a first object corresponding to the first virtual object, based on the first user input.

According to certain embodiments, a method of operating an electronic device comprises: capturing at least one image through at least one camera of the electronic device, identifying at least one object located around the electronic device, based at least in part on the at least one image, identifying sound information attributable to the identified at least one object from first sound data input through at least one microphone of the electronic device, displaying at least one virtual object corresponding to the at least one object at a position corresponding to the identified at least one object through at least one display module of the electronic device, wherein the position is determined based on the sound information, obtaining a first user input associated with a first virtual object among the at least one virtual object, and determining a noise cancellation (NC) level of a first object corresponding to the first virtual object, based on the first user input.

DETAILED DESCRIPTION

Noise canceling (NC) is a technology for canceling out or blocking external noise that interferes with hearing sound from an audio device. The noise cancellation technology includes an active noise canceling (ANC) method and a passive noise canceling (PNC) method. The active noise cancellation method is a method of analyzing the wave of external noise and generating a wave having the opposite phase of the wave to cancel the noise. The passive noise cancellation method is a method of physically blocking noise.

A noise cancellation device may be a wearable electronic device. For example, noise cancellation devices that can be worn on or near the ear, such as headsets or earphones, have become widespread.

According to certain embodiments of the disclosure, it is possible to provide an augmented reality device including a method for controlling a real sound using a noise cancellation device in an augmented reality environment.

According to certain embodiments, by providing a wearable electronic device for controlling noise canceling of an external wearable electronic device and a method of operating the same, it is possible to control a virtual sound and a real sound in an augmented reality environment, which makes it possible for the user to experience a realistic augmented reality environment.

Figure 1:
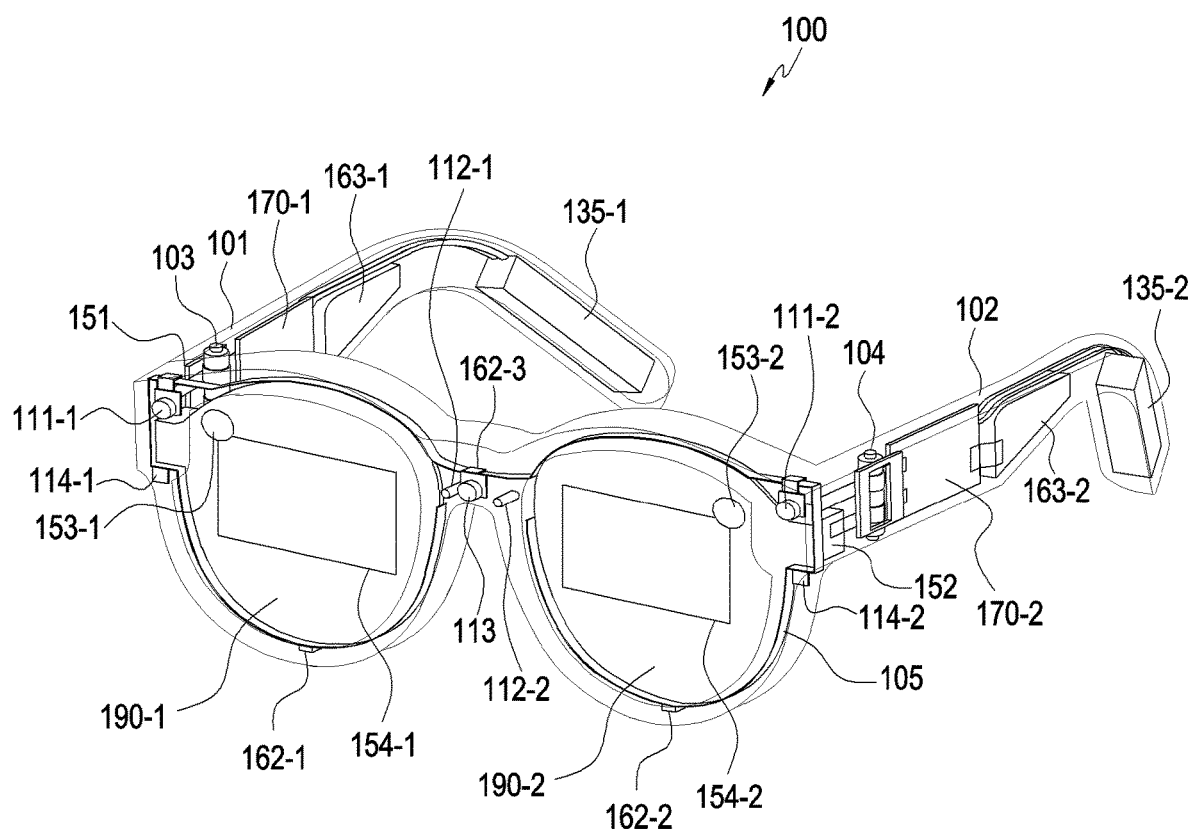
FIG. 1 illustrates the structure of a wearable electronic device, according to certain embodiments.

FIG. 1 illustrates the structure of a wearable electronic device 100. The wearable electronic device 100, which will be explained in more detail below, incorporates augmented reality. Augmented reality makes it possible for the user to see a real environment, and providing a better sense of reality through additional information. The wearable electronic device 100 includes cameras 111-1, 111-2, 112-1, 112-2, and/or 113 for capturing the real environment surrounding the user. The real environment surrounding the user can be displayed on the displays 151, 152, as well as additional information regarding the real environment.

Additionally, the user can also hear virtual sounds through speakers 163-1 and 163-2. However, the sound often includes a mixture of virtual sounds and ambient noise. The ambient noise can be distracting and deteriorate the user experience. Accordingly, the wearable electronic device 100 includes uses noise cancellation.

FIG. 1 illustrates the structure of a wearable electronic device, according to certain embodiments. The wearable electronic device 100 may include a frame 105, a first support 101, a second support 102, a first hinge 103 connecting the frame 105 with the first support 101, and/or a second hinge 104 connecting the frame 105 with the second support 102.

The frame 105 may also include one or more first cameras 111-1 and 111-2, one or more second cameras 112-1 and 112-2, and/or a third camera 113, one or more light-emitting elements 114-1 and 114-2, a first display 151 and a second display 152, one or more sound input devices 162-1, 162-2 and 162-3, or one or more transparent members 190-1 and 190-2.

An image obtained through the one or more first cameras 111-1 and 111-2 may be used for detecting a hand gesture by a user, tracking a user's head, and/or recognizing a space. The one or more first cameras 111-1 and 111-2 may be GS (global shutter) cameras. The one or more first cameras 111-1 and 111-2 may perform a SLAM (simultaneous localization and mapping) operation through depth photographing. The one or more first cameras 111-1 and 111-2 may perform spatial recognition for 6 DoF (degrees of freedom).

An image obtained through the one or more second cameras 112-1 and 112-2 may be used to detect and track the user's pupils. For example, an image obtained through the one or more second cameras 112-1 and 112-2 may be used to track the user gaze direction. The one or more second cameras 112-1 and 112-2 may be GS cameras. The one or more second cameras 112-1 and 112-2 may respectively correspond to the left eye and the right eye, and the performance of the one or more second cameras 112-1 and 112-2 may be substantially the same.

The at least one third camera 113 may be a high-resolution camera. The at least one third camera 113 may execute an auto-focusing (AF) function or a shake correction function. The at least one third camera 113 may be a GS camera or an RS (rolling shutter) camera.

The wearable electronic device 100 may include one or more light-emitting elements 114-1 and 114-2. The light-emitting elements 114-1 and 114-2 are different from a light source, which will be described later, for emitting light to a screen output area of the display. The light-emitting elements 114-1 and 114-2 may emit light to facilitate detecting of the pupils in detecting and tracking of the user's pupils through the one or more second cameras 112-1 and 112-2. The light-emitting elements 114-1 and 114-2 may include LEDs. The light-emitting elements 114-1 and 114-2 may emit infrared rays. The light-emitting elements 114-1 and 114-2 may be attached to the periphery of the frame 105 of the wearable electronic device 100. The light-emitting elements 114-1 and 114-2 may be located in the vicinity of the one or more first cameras 111-1 and 111-2, and assist the one or more first cameras 111-1 and 111-2 in gesture detection, head tracking, and/or spatial recognition when the wearable electronic device 100 is used in a dark environment. The light-emitting elements 114-1 and 114-2 may be located in the vicinity of the at least one third camera 113 and assist the at least one third camera 113 in obtaining images when the wearable electronic device 100 is used in a dark environment.

The wearable electronic device 100 may include a first display 151, a second display 152, one or more optical input members 153-1 and 153-2, one or more transparent members 190-1 and 190-2, and/or one or more screen display regions 154-1 and 154-2, which are positioned in the frame 105. The first display 151 and the second display 152 may include, for example, a liquid crystal display (LCD), a digital mirror device (DMD), a liquid crystal-on-silicon (LCoS) display, an organic light-emitting diode (OLED), or a micro light-emitting diode (micro LED). According to certain embodiments, in the case where the first display 151 and the second display 152 are configured as one of a liquid crystal display device, a digital mirror device, or a liquid crystal-on-silicon display, the wearable electronic device 100 may include a light source for emitting light to a screen output area of the display. According to other certain embodiments, in the case where the first display 151 and/or the second display 152 are able to emit light by themselves, for example, in the case where they are configured as one of an organic light-emitting diode or a micro LED, it is possible to provide a virtual image of good quality to the user even if the wearable electronic device 100 does not include a separate light source.

The one or more transparent members 190-1 and 190-2 may be disposed to face the user's eyes when the user wears the wearable electronic device 100. The one or more transparent members 190-1 and 190-2 may include at least one of a glass plate, a plastic plate, and a polymer. According to certain embodiments, when the user wears the wearable electronic device 100, the user can see the external world through the one or more transparent members 190-1 and 190-2. According to certain embodiments, one or more optical input members 153-1 and 153-2 may guide the light generated by the first display 151 and/or the second display 152 to the user's eyes. An image based on the light generated by the first display 151 and the second display 152 may be formed on the one or more screen display regions 154-1 and 154-2 on the one or more transparent members 190-1 and 190-2, and the user may see the image formed on the one or more screen display regions 154-1 and 154-2.

The wearable electronic device 100 may include one or more optical waveguides (not shown). The optical waveguide may transmit the light generated by the first display 151 and the second display 152 to the user's eyes. The wearable electronic device 100 may include optical waveguides that respectively correspond to the left eye and the right eye. The optical waveguide may include at least one of glass, plastic, or polymer. The optical waveguide may include a nano-pattern, for example, a polygonal or curved grated structure, formed on an internal or external surface. The optical waveguide may include a free-form type prism, and in this case, the optical waveguide may provide incident light to the user through a reflection mirror. The optical waveguide may include at least one of at least one diffractive element (e.g., a DOE (diffractive optical element) or a HOE (holographic optical element)) or a reflective element (e.g., a reflection mirror), and guide the display light emitted from a light source to the user's eyes using the at least one diffractive element or reflective element included therein. The diffractive element may include an optical input/output member. The reflective element may include a member causing total reflection.

The wearable electronic device 100 may include one or more sound input devices 162-1, 162-2, and 162-3 (e.g., microphones), and the one or more sound input devices 162-1, 162-2, and 162-3 may receive an input sound of the user or an input sound generated in the vicinity of the wearable electronic device 100. For example, the one or more sound input devices 162-1, 162-2, and 162-3 may receive an input sound generated in the vicinity and transmit the same to a processor (e.g., the processor 320 in FIG. 3).

According to certain embodiments, one or more supports (e.g., the first support 101 and the second support 102) may include PCBs (e.g., a first PCB 170-1 and a second PCB 170-2), one or more sound output devices 163-1 and 163-2, and one or more batteries 135-1 and 135-2. The first PCB 170-1 and the second PCB 170-2 may transmit electrical signals to elements included in the wearable electronic device 100, such as a first camera 211, a second camera 212, a third camera 213, a display module 250, an audio module 261, and/or a sensor 280, which will be described later with reference to FIG. 2. The first PCB 170-1 and the second PCB 170-2 may be FPCBs. According to certain embodiments, each of the first PCB 170-1 and the second PCB 170-2 may include a first substrate, a second substrate, and an interposer disposed between the first substrate and the second substrate. The wearable electronic device 100 may include batteries 135-1 and 135-2. The batteries 135-1 and 135-2 may store power for operating the remaining elements of the wearable electronic device 100. The one or more sound output devices 163-1 and 163-2 (e.g., speakers) may output audio data to the user. For example, it is possible to provide feedback on a user's command (or input) or to provide information on a virtual object to the user through audio data.

The wearable electronic device 100 may include one or more hinges (e.g., the first hinge 103 and the second hinge 104). For example, the first hinge 103 may couple the first support 101 to the frame 105 so as to be rotatable with respect to the frame 105, and the second hinge 104 may couple the second support 102 to the frame 105 so as to be rotatable with respect to the frame 105.

As noted above, the wearable electronic device 100 uses noise cancellation to remove or reduce ambient noise. The wearable electronic device 100 uses one of the camera 111-1, 111-2, 112-1, 112-2, and/or 113 to obtain image(s) of the environment surrounding the user, as well as information about the surrounding environment from an external source. The wearable electronic device 100 uses the foregoing to identify object(s) in the surrounding environment.

With the identification of object(s) in the surrounding environments, the electronic wearable device 100 can obtain sound data regarding the object(s), and then identify sound from the microphones 162-1, 162-2, and 162-3 that corresponds to the object(s) and cancel it.

Figure 2:
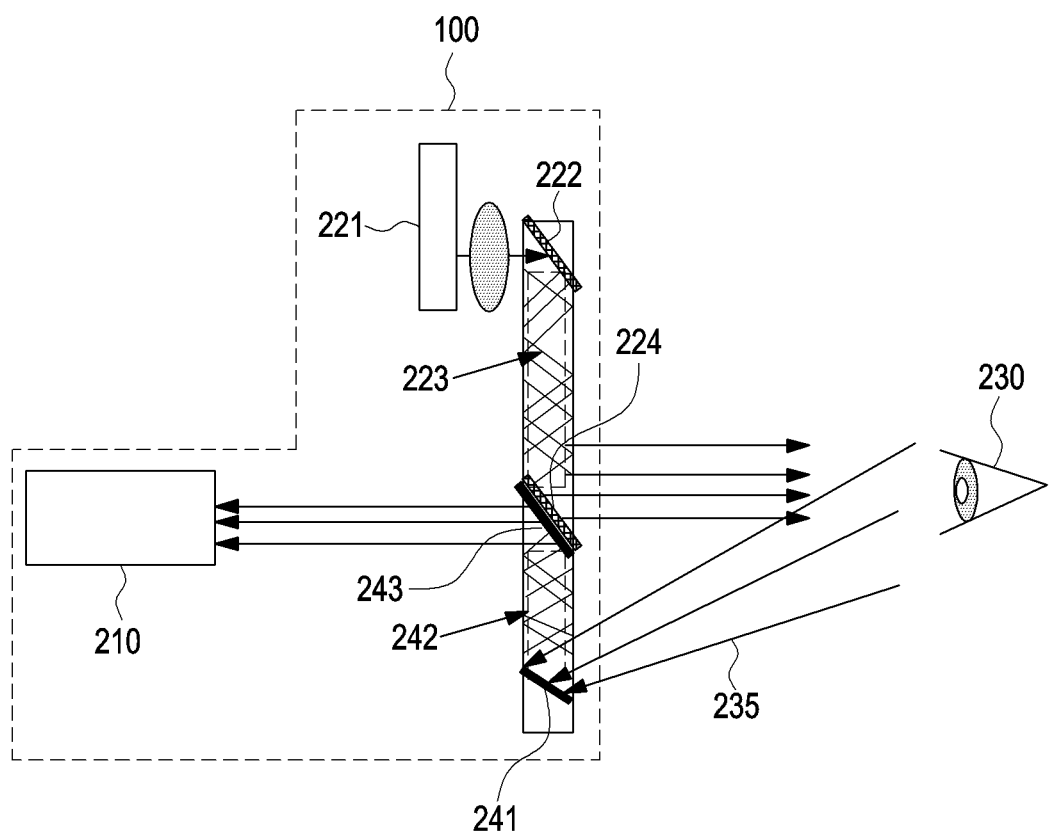
FIG. 2 illustrates the structures of a display and an eye tracking camera of a wearable electronic device, according to certain embodiments.

FIG. 2 illustrates the structures of a display and an eye tracking camera of a wearable electronic device, according to certain embodiments. The wearable electronic device 100 may include a display 221, an optical input member 222, an optical display waveguide 223, an optical output member 224, an eye tracking camera 210, a first splitter 241, an optical eye tracking waveguide 242, and/or a second splitter 243.

In the wearable electronic device 100, the display 221 may be one of the first display 151 or the second display 152 shown in FIG. 1. The light output from the display 221 may pass through the optical input member 222 (e.g., the optical input members 153-1 and 153-2 in FIG. 1) to be incident on the optical display waveguide 223, and may be output through the optical output member 224 via the optical display waveguide 223. The light output from the optical output member 224 may be seen by the user with an eye 230. Hereinafter, in this specification, the expression "display an object on the display" may indicate that the light output from the display 221 is output through the optical output member 224 and that the shape of the object is seen in the eye 230 of the user by the light output through the optical output member 224. In addition, the expression "control the display to display an object" may indicate that the display 221 is controlled such that the light output from the display 221 is output through the optical output member 224 and such that the shape of the object is seen in the eye 230 of the user.

The light 235 reflected from the eye 230 of the user may pass through the first splitter 241 to be incident on the optical eye tracking waveguide 242, and pass through the optical eye tracking waveguide 242 to be output to the eye tracking camera 210 through the second splitter 243. The light 235 reflected from the eye 230 of the user may be the light output from the light-emitting elements 114-1 and 114-2 in FIG. 1 and reflected from the eye 230 of the user. The eye tracking camera 210 may be the one or more second cameras 112-1 and 112-2 shown in FIG. 1.

Figure 3:
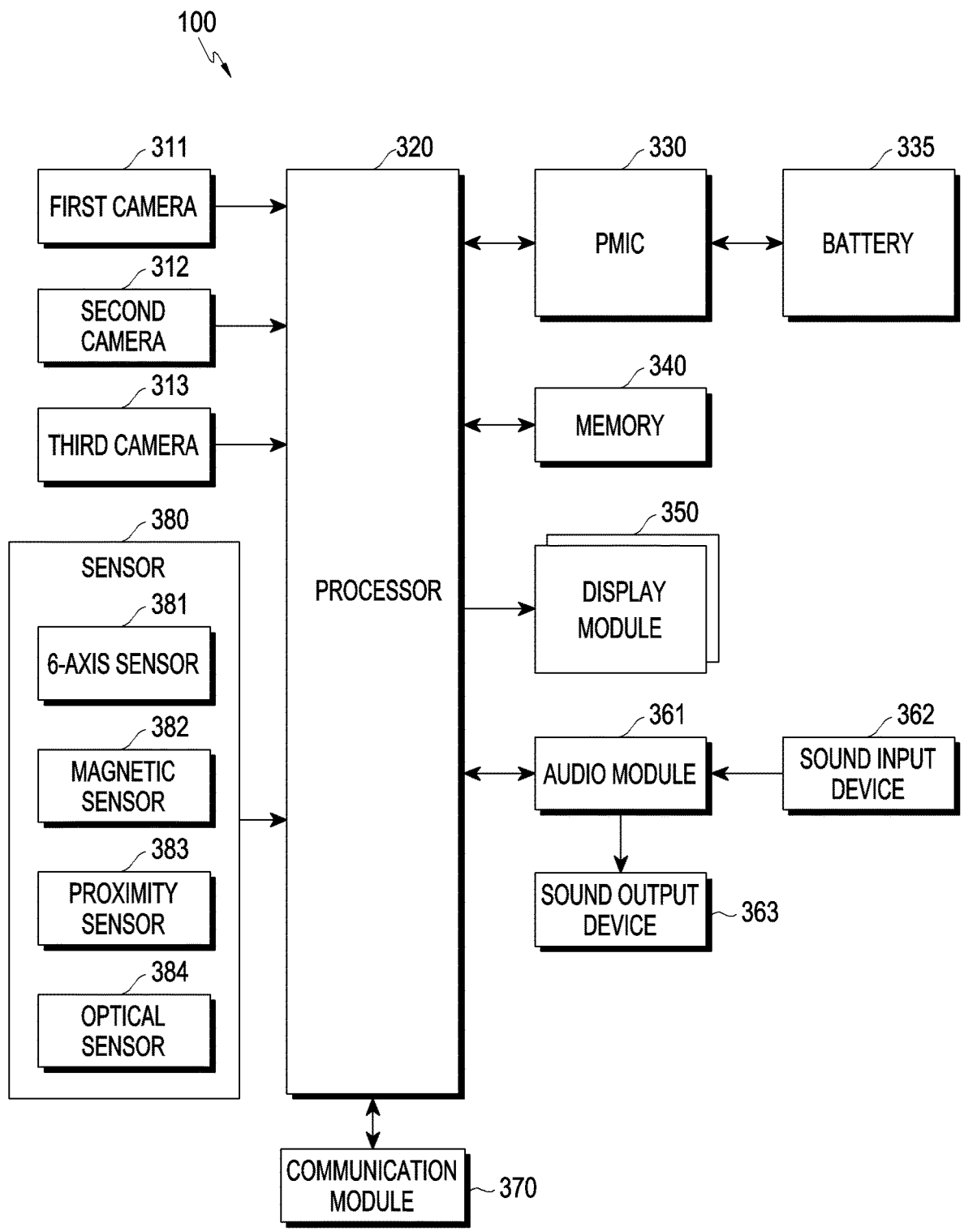
FIG. 3 illustrates a block diagram of a wearable electronic device, according to certain embodiments.

FIG. 3 illustrates a block diagram of a wearable electronic device, according to certain embodiments.

Referring to FIG. 3, according to certain embodiments, the wearable electronic device 100 may include a first camera 311, a second camera 312, a third camera 313, a processor 320, a PMIC 330, a battery 335, a memory 340, a display module 350, an audio module 361, a sound input device 362, a sound output device 363, communication module 370, and/or a sensor 380.

According to certain embodiments, details of the one or more first cameras 111-1 and 111-2, the one or more second camera 112-1 and 112-2, and at least one third camera 113, which have been described above with reference to FIG. 1, may be applied to each of the first camera 311, the second camera 312, and the third camera 313 in substantially the same manner. The wearable electronic device 100 may include a plurality of at least one of the first cameras 311, the second cameras 312, and the third cameras 313.

The processor 320 may control other elements of the wearable electronic device 100, for example, the first camera 311, the second camera 312, the third camera 313, and the PMIC 330, the memory 340, the display module 350, the audio module 361, the communication module 370, and/or the sensor 380, and perform processing of a variety of data or operations.

The PMIC 330 may convert power stored in the battery 335 to have a current or voltage required by other elements of the wearable electronic device 100 and supply the same to other elements of the wearable electronic device 100.

The memory 340 may store a variety of data used by at least one element (e.g., the processor 320 or the sensor module 380) of the wearable electronic device 100.

The display module 350 may display a screen to be provided to the user. The display module 350 may include the first display 151, the second display 152, the one or more optical input members 153-1 and 153-2, the one or more transparent members 190-1 and 190-2, and/or the one or more screen display regions 154-1 and 154-2, which have been described above with reference to FIG. 1.

The audio module 361 may be connected to the sound input device 362 and the sound output device 363, convert data input through the sound input device 362, and may convert the data to be output to the sound output device 363. The sound output device 363 may include a speaker and an amplifier. The sound output device 363 may indicate the one or more sound output devices 163-1 and 163-2 in FIG. 1. The sound input device 362 may indicate one or more sound input devices 162-1, 162-2, and 162-3 in FIG. 1.

The communication module 370 may support establishment of a wireless communication channel with an electronic device outside the wearable electronic device 100 and communication through the established communication channel.

The sensor 380 may include a 6-axis sensor 381, a magnetic sensor 382, a proximity sensor 383, and/or an optical sensor 384. The sensor 380 may include a sensor for obtaining a biometric signal for detecting whether or not the wearable electronic device 100 is worn by the user. For example, the sensor 380 may include at least one of a heart rate sensor, a skin sensor, and a temperature sensor.

The processor 320 may identify movement of the user wearing the wearable electronic device 100 through the 6-axis sensor 381. For example, the 6-axis sensor 381 may detect a change in the direction in which the user faces (e.g., the direction in which the user views through the wearable electronic device 100) to generate a sensor value, and transmit the generated sensor value or the amount of change in the sensor value to the processor 320.

The audio module 361 may receive a sound generated in the vicinity of the wearable electronic device 100 (or the user) through the sound input device 362, and transmit data converted from the received sound to the processor 320.

The communication module 370 may transmit/receive data to and from an external electronic device (e.g., a wearable electronic device (e.g., earphones) or an external electronic device (e.g., a terminal)). For example, the wearable electronic device 100 may receive audio data received by the external wearable electronic device through the communication module 370, and transmit the received audio data to the processor 320. As another example, the wearable electronic device 100 may output, through the display module 350, image data based on the data received from the external electronic device through the communication module 370.

Figure 4:
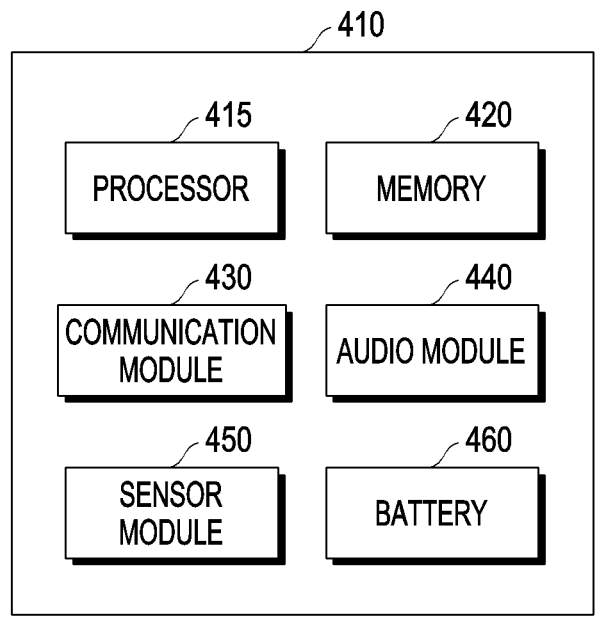
FIG. 4 is a block diagram of an external wearable electronic device, according to certain embodiments.

FIG. 4 is a block diagram of an external wearable electronic device, according to certain embodiments. The external wearable electronic device 410 may be a wearable electronic device in the form of earphones. The external wearable electronic device 410 may have a plurality of physically separated housings. For example, in the case where the external wearable electronic device 410 is a wearable electronic device in the form of earphones, the external wearable electronic device 410 may include a first housing to be worn on the left ear and a second housing to be worn on the right ear, and in this case, the respective elements shown in FIG. 4 may be included in one or more of the plurality of housings. In certain embodiments, the external wearable electronic device 410 can correspond to sound output devices 163-1 and 163-2.

The external wearable electronic device 410 may include a processor 415, a memory 420, a communication module 430, an audio module 440, a sensor module 450, and/or a battery 460.

The processor 415 may receive data from other elements of the external wearable electronic device 410, for example, the memory 420, the communication module 430, the audio module 440, the sensor module 450, and/or the battery 460, perform operations based on the received data, and transmit signals for controlling other elements to other elements. The processor 415 may operate based on instructions stored in the memory 420.

The memory 420 may store instructions that cause other elements of the external wearable electronic device 410, for example, the processor 415, the communication module 430, the audio module 440, the sensor module 450, and/or the battery 460 to perform specified operations. The memory 420 may store audio data obtained through the audio module 440.

The communication module 430 may perform wireless communication with another electronic device (e.g., the wearable electronic device 100). The communication module 430 may transmit information obtained from the external wearable electronic device 410 to the wearable electronic device 100. As another example, the communication module 430 may receive audio data from the wearable electronic device 100. The type of communication supported by the communication module 430 is not limited.

The audio module 440 may include a plurality of microphones and/or one or more speakers. The plurality of microphones may include a microphone facing in the direction toward the user's inner ear when the user wears the external wearable electronic device 410 and a microphone facing in the direction away from the user when the user wears the external wearable electronic device 410. The audio module 440 may obtain audio data through the plurality of microphones, respectively, and perform noise canceling, based on the audio data obtained through the plurality of microphones. The audio module 440 may output audio data obtained from another electronic device (e.g., the wearable electronic device 100) through the communication module 430. As another example, the audio module 440 may perform noise canceling, based on audio data obtained from another electronic device (e.g., the wearable electronic device 100) through the communication module 430.

The sensor module 450 may include a biometric sensor for detecting whether or not the user wears the external wearable electronic device 410. For example, the biometric sensor may include at least one of a heart rate sensor, a skin sensor, and a temperature sensor. The sensor module 450 may include a geomagnetic sensor.

The external wearable electronic device 410 may receive a request for data transmission from the wearable electronic device 100 through the communication module 430. For example, the external wearable electronic device 410 may receive a request for transmission of audio data received through the audio module 440.

Figure 5:
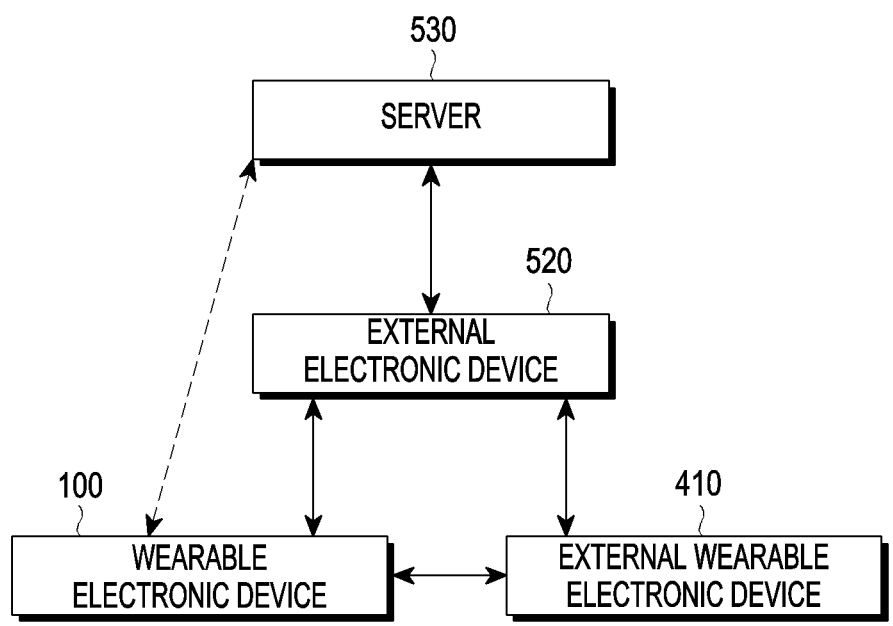
FIG. 5 is a block diagram of electronic devices in a network environment, according to certain embodiments.

FIG. 5 is a block diagram of electronic devices in a network environment, according to certain embodiments. Referring to FIG. 5, the network environment may include a wearable electronic device 100, an external wearable electronic device 410, an external electronic device 520 (e.g., the electronic device 2201 to be described later with reference to FIG. 22), and/or a server 530 (e.g., the server 2208 to be described later with reference to FIG. 22).

Referring to FIG. 5, according to certain embodiments, the wearable electronic device 100 may communicate with the external wearable electronic device 410. The wearable electronic device 100 may communicate with the external electronic device 520. The external electronic device 520 may communicate with the external wearable electronic device 410. The wearable electronic device 100 may perform indirect communication with the external wearable electronic device 410 through the external electronic device 520. The external electronic device 520 may communicate with the server 530. The wearable electronic device 100 may perform indirect communication with the server 530 through the external electronic device 520. The wearable electronic device 100 may directly communicate with the server 530. Referring to FIG. 5, electronic devices in the network environment may communicate with each other, and there is no limitation as to the communication method. Although the wearable electronic device 100 and the external wearable electronic device 410 are shown as separate, it shall be understood that in some embodiments, the wearable electronic device 100 and the external wearable electronic device 410 can be integrated into a single device. Thus, communication between the wearable electronic device 100 and the external wearable electronic device 410 may be through internal circuitry.

Figure 6:
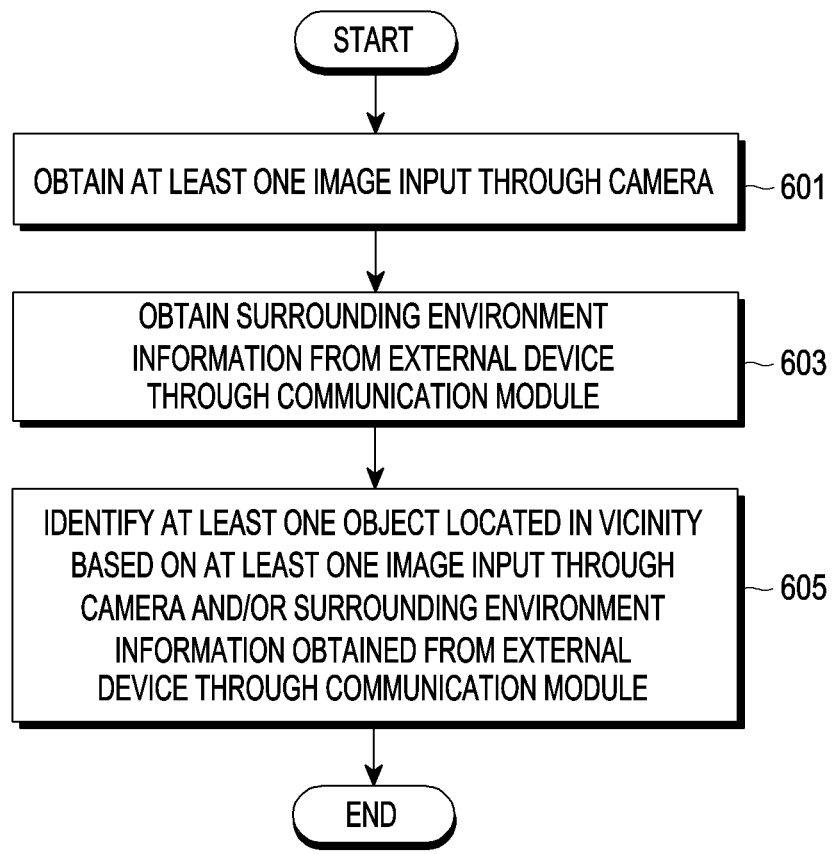
FIG. 6 is a flowchart illustrating a method of operating a wearable electronic device, according to certain embodiments.

FIG. 6 is a flowchart illustrating a method of operating a wearable electronic device according to certain embodiments.

Referring to FIG. 6, in operation 601, according to certain embodiments, a wearable electronic device 100 (e.g., the processor 320) may obtain at least one image input through at least one camera (e.g., the first camera 311, the second camera 312, and/or the third camera 313). For example, the wearable electronic device 100 may obtain at least one image including at least one object located in the vicinity of the wearable electronic device 100 through at least one camera.

In operation 603, according to certain embodiments, the wearable electronic device 100 may obtain surrounding environment information from an external device (e.g., the external electronic device 520 and/or the server 530) through the communication module 370. For example, the surrounding environment information may include position information, sound information, and/or state information of at least one object located in the vicinity of the wearable electronic device 100. For example, the position information of at least one object may include global positioning system (GPS) coordinate information of at least one object and/or relative coordinate information between the wearable electronic device 100 and at least one object (e.g., distance information or direction information). For example, the sound information of at least one object may include information on the type of sound, the volume of sound, the frequency, waveform, and amplitude of sound, and/or the direction of sound of at least one object. For example, the state information of at least one object may include an operation state of at least one object (e.g., a speaker output state of an external speaker or a power operation state of a peripheral home appliance). The wearable electronic device 100 may transmit current position information of the wearable electronic device 100 to an external device (e.g., the external electronic device 520 and/or the server 530) through the communication module 370, and obtain surrounding environment information about an object (e.g., an external speaker, a peripheral home appliance, a surrounding construction site, an external performance hall, a surrounding airport, or a surrounding road) located in the vicinity of the wearable electronic device 100 from the external device.

In operation 605, according to certain embodiments, the wearable electronic device 100 may identify at least one object (hereinafter, a surrounding object) located in the vicinity of the wearable electronic device 100, based on at least one image (hereinafter, an input image) input through at least one camera (e.g., the first camera 311, the second camera 312, and/or the third camera 313) in operation 601, and/or surrounding environment information (hereinafter, surrounding environment information) obtained from the external device (e.g., the external electronic device 520 and/or server 530) through the communication module 370 in operation 603. For example, the wearable electronic device 100 may identify surrounding objects using only an input image. For example, the wearable electronic device 100 may identify surrounding objects included in the input image even in the case of failing to obtain the surrounding environment information. As another example, the wearable electronic device 100 may identify surrounding objects using only surrounding environment information. For example, even when an input image is not received, the wearable electronic device 100 may identify surrounding objects, based on surrounding environment information. As another example, the wearable electronic device 100 may identify surrounding objects, based on an input image and surrounding environment information. For example, the wearable electronic device 100 may identify both the surrounding objects included in the input image and the surrounding objects identified based on the surrounding environment information. As described above, any one of operation 601 or operation 603 may be omitted.

For example, if user is in their kitchen and there is a blender that is in operation, the blender will generate considerable noise. The camera can obtain a picture that includes the blender during operation 601. During operation 603, the wearable electronic device 100 may determine that the user's location is in their kitchen using GPS coordinates. Moreover, the wearable electronic device 100 may also receive information of appliances that are commonly found in the kitchen, such as blenders, dishwashers, microwave ovens, etc., as well as their typical noise patterns. During operation 605, the wearable electronic device 100 can determine that the image includes a blender.

According to certain embodiments, if a surrounding object identified based on the surrounding environment information obtained from an external device (e.g., the external electronic device 520 and/or the server 530) is not included in at least one image input through at least one camera (e.g., the first camera 311, the second camera 312, and/or the third camera 313), the wearable electronic device 100 may display, through the display module 350, a virtual object corresponding to a surrounding object that is identified based on the surrounding environment information (e.g., if the surrounding object is an airport, an icon corresponding to the airport) at a corresponding position identified based on the surrounding environment information. At this time, if the surrounding object identified based on the surrounding environment information is located outside a display range of the display module 350 of the wearable electronic device 100, the wearable electronic device 100 may display a virtual object indicating the position corresponding to the surrounding object (e.g., an arrow object pointing to the position corresponding to the surrounding object).

For example, if there is an object of note that is behind the user's back, the wearable electronic device 100 can place a virtual object indicating its relative presence to the user. If, for instance, behind the user to the right, there is an exit, the wearable electronic device 100 can place a symbol for an exit door with a notation "4:00" indicating the direction from the user).

Figure 7:
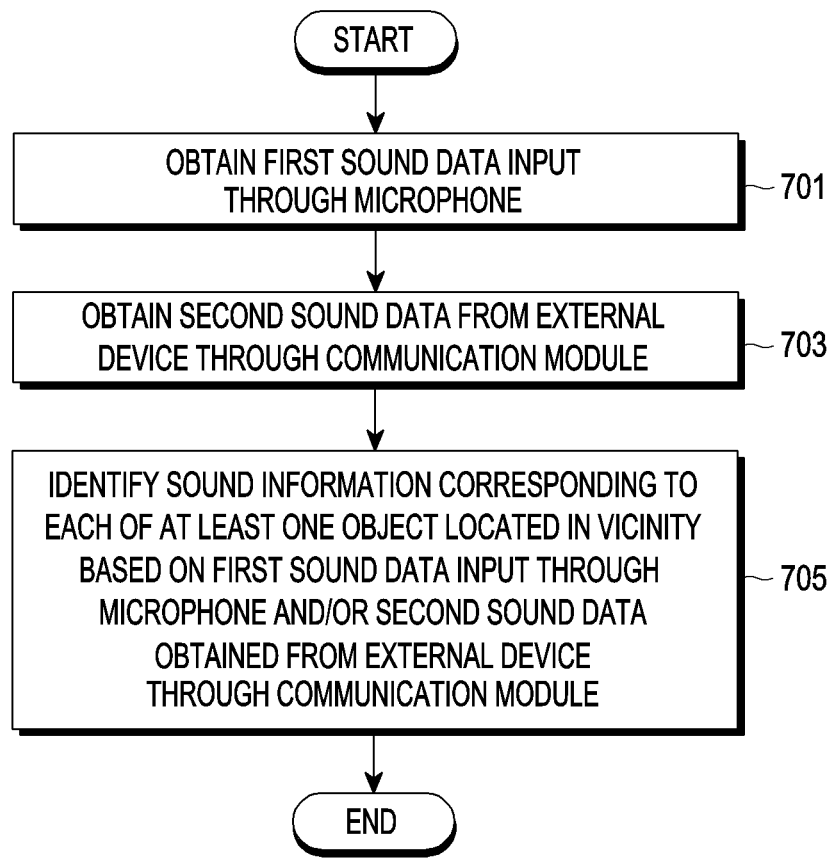
FIG. 7 is a flowchart illustrating a method of operating a wearable electronic device according to certain embodiments.

FIG. 7 is a flowchart illustrating a method of operating a wearable electronic device, according to certain embodiments.

Referring to FIG. 7, in operation 701, according to certain embodiments, the wearable electronic device 100 (e.g., the processor 320) may obtain first sound data input through at least one microphone (e.g., the sound input device 362 in FIG. 3). For example, the wearable electronic device 100 may obtain first sound data converted from a sound from at least one object located in the vicinity of the wearable electronic device 100 through at least one microphone.

In operation 703, according to certain embodiments, the wearable electronic device 100 may obtain second sound data from an external device (e.g., the external wearable electronic device 410 and/or the external electronic device 520) through the communication module 370. For example, the external wearable electronic device 410 may obtain second sound data converted from a sound from at least one object located in the vicinity thereof, and the wearable electronic device 100 may receive the second sound data from the external wearable electronic device 410 through the communication module 370.

In operation 705, according to certain embodiments, based on the first sound data input through the at least one microphone in operation 701 and/or the second sound data obtained from the external device (e.g., the external wearable electronic device 410 and/or the external electronic device 520) through the communication module 370 in operation 703, the wearable electronic device 100 may identify sound information (e.g., information about the type of sound, the volume of sound, the frequency, waveform, and amplitude of sound, and/or the direction of sound corresponding to each of at least one object) corresponding to at least one object located in the vicinity of the wearable electronic device 100 (hereinafter, surrounding objects).

For example, the wearable electronic device 100 may identify sound information of surrounding objects using only the first sound data. As another example, the wearable electronic device 100 may identify sound information of surrounding objects only using the second sound data. As another example, the wearable electronic device 100 may identify sound information of surrounding objects, based on the first sound data and the second sound data. For example, the wearable electronic device 100 may obtain third sound data by processing the first sound data, based on the second sound data, and identify sound information of each surrounding object, based on the third sound data. For example, the process for obtaining the third sound data may be a noise cancellation process for removing ambient noise except for a sound corresponding to the surrounding objects. As described above, any one of operation 701 or operation 703 may be omitted.

In the example where the user is in their kitchen where there is a blender, the microphone can pick up the sound from the blender during its operation during operation 701. During operation 703, the wearable electronic device 100 can obtain information about the sound characteristics of a blender and during operation 705, the wearable electronic device 100 can determine that portion of the signal picked up by the microphone that is attributable to the blender.

Figure 8:
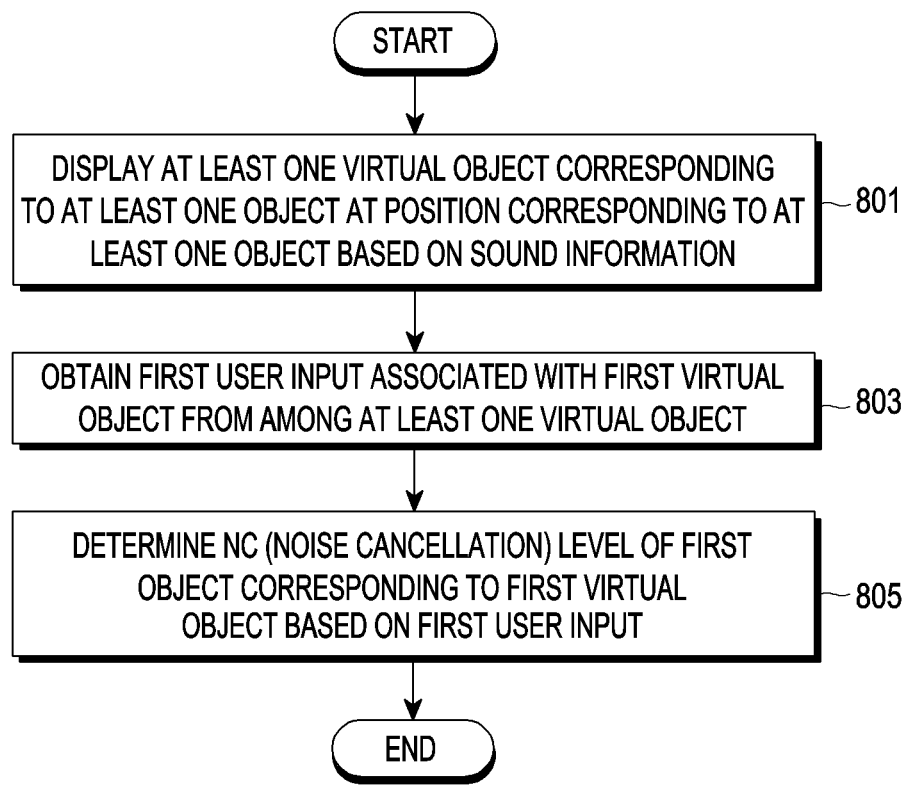
FIG. 8 is a flowchart illustrating a method of operating a wearable electronic device, according to certain embodiments.
Figure 9:
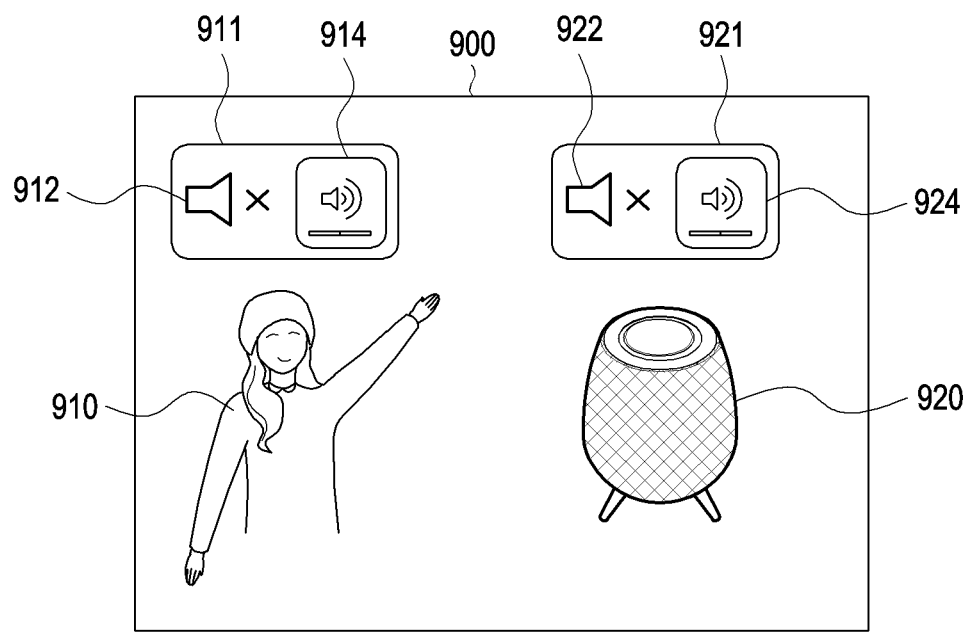
FIG. 9 is a diagram illustrating a method of operating a wearable electronic device.

FIG. 8 is a flowchart illustrating a method of operating a wearable electronic device, according to certain embodiments. FIG. 8 will be described with reference to FIG. 9. FIG. 9 is a diagram illustrating a method of operating a wearable electronic device.

Referring to FIG. 8, in operation 801, according to certain embodiments, the wearable electronic device 100 (e.g., the processor 320), based on sound information (e.g., the sound information included in the surrounding environment information obtained in operation 603 in FIG. 6 and/or the sound information identified in operation 705 in FIG. 7), may display, through the display module 350 of the wearable electronic device 100, at least one virtual object corresponding to the at least one object at a position corresponding to the at least one object located in the vicinity of the wearable electronic device 100.

For example, referring to FIG. 9, the wearable electronic device 100 may display an augmented reality screen 900 through the display module 350. The user may recognize at least one object (e.g., a first object 910 corresponding to a person and/or a second object 920 corresponding to an external speaker) located in the vicinity thereof directly through the eyes of the user while wearing the wearable electronic device 100. The user may recognize the augmented reality screen 900 displayed through the display module 350 of the wearable electronic device 100. Accordingly, the user may recognize objects existing in reality (e.g., the first object 910 and/or the second object 920) and virtual objects (e.g., the first virtual object 911 and/or the second virtual object 921) displayed on the augmented reality screen 900 while wearing the wearable electronic device 100. The wearable electronic device 100 may display the first virtual object 911 corresponding to the first object 910 at a position corresponding to the first object (e.g., the area nearby the first object 910), and display the second virtual object 921 corresponding to the second object 920 at a position corresponding to the second object (e.g., the area nearby the second object 920).

For example, referring to FIG. 9, the first virtual object 911 and/or the second virtual object 921 may include virtual objects (e.g., 912 and 922) indicating whether or not to block noise and/or virtual objects (e.g., 914 and 924) for adjusting the noise volume. The virtual object 912, which is included in the first virtual object 911, for indicating whether or not to block noise may be a virtual object indicating whether or not to block the sound from the first object 910 corresponding to the first virtual object 911, and the virtual object 922, which is included in the second virtual object 921, for indicating whether or not to block noise may be a virtual object indicating whether or not to the sound from the second object 920 corresponding to the second virtual object 921. The virtual object 914 for noise volume adjustment included in the first virtual object 911 may be a virtual object indicating the degree of adjusting the output volume of the sound from the first object 910 corresponding to the first virtual object 911, and the virtual object 924 for noise volume adjustment included in the second virtual object 921 may be a virtual object indicating the degree of adjusting the output volume of the sound from the second object 920 corresponding to the second virtual object 921.

The wearable electronic device 100 (e.g., the processor 320) may determine whether or not to display a virtual object (e.g., the first virtual object 911) corresponding to a specific object (e.g., the first object 910) among the at least one object located in the vicinity of the wearable electronic device 100 (e.g., the first object 910 or the second object 920 in FIG. 9, or surrounding objects identified based on surrounding environment information obtained from an external device (e.g., the external electronic device 520 and/or the server 530)), based on the volume of sound included in the sound information corresponding to the specific object (e.g., the first object 910), and/or whether the volume of the sound exceeds a threshold.

The wearable electronic device 100 may determine to display a virtual object (e.g., the first virtual object 911) corresponding to a specific object (e.g., the first object 910), based on that the volume of sound included in the sound information corresponding to the specific object (e.g., the first object 910) is greater than or equal to a predetermined first volume or is less than or equal to a predetermined second volume. At this time, the second volume may be less than the first volume. For example, referring to FIG. 9, the wearable electronic device 100 may determine to display the first virtual object 911 corresponding to the first object 910 and the second virtual object 921 corresponding to the second object 920, based on that the volume of sound included in sound information corresponding to the first object 910 is less than or equal to a predetermined second volume and that the volume of sound included in sound information corresponding to the second object 920 is greater than or equal to a predetermined first volume. Alternatively, although not shown, the wearable electronic device 100 may determine to display the first virtual object 911 corresponding to the first object 910 and to not display the second virtual object 921 corresponding to the second object 920, based on that the volume of sound included in sound information corresponding to the first object 910 is less than or equal to a predetermined second volume and that the volume of sound included in sound information corresponding to the second object 920 is less than or equal to a predetermined first volume and greater than or equal to a predetermined second volume.

In operation 803, according to certain embodiments, the wearable electronic device 100 may obtain a user input (e.g., a first user input) associated with a virtual object (e.g., the first virtual object 911) among the at least one virtual object (e.g., 911 and 921). For example, the wearable electronic device 100 may obtain a user gesture input (e.g., an input for selecting a specific virtual object (e.g., 912) displayed on the augmented reality screen 900 by moving the user's hand to a specific position) through at least one camera (e.g., the first camera 311, the second camera 312, and/or the third camera 313). As another example, the wearable electronic device 100 may obtain a user gaze input (e.g., an input for selecting a virtual object (e.g., 912) corresponding to the user gaze direction from among the virtual objects displayed on the augmented reality screen 900) by tracking the eye of the user through at least one camera (e.g., the first camera 311, the second camera 312, and/or the third camera 313). As another example, the wearable electronic device 100 may obtain a user utterance input (e.g., an input for selecting a virtual object (e.g., 912) corresponding to the user's utterance) through at least one microphone (e.g., the sound input device 362 in FIG. 3). As another example, the wearable electronic device 100 may obtain a user input through a separate input device (e.g., an input device (e.g., a keyboard device, a mouse device, a pad device, or a hand-held device) for communicating with the wearable electronic device 100 through the communication module 370, or an input device included in the wearable electronic device 100 (e.g., a button input device (not shown) or a touch input device (not shown) included in the wearable electronic device 100)). For example, the wearable electronic device 100 may obtain a user gesture input, a user gaze input, a user utterance input, or a user input through a separate input device for selecting the first virtual object 911 or a virtual object (e.g., 912 or 914) included in the first virtual object 911.

In operation 805, according to certain embodiments, the wearable electronic device 100 may determine a noise cancellation level (hereinafter, an NC level) of an object (e.g., the first object 910) corresponding to a specific virtual object (e.g., first virtual object 911), based on a user input (e.g., a first user input) associated with the specific virtual object (e.g., the first virtual object 911) among the at least one virtual object (e.g., the first virtual object 911 and/or the second virtual object 921) displayed on the augmented reality screen 900. The NC level will be described in detail later with reference to FIG. 12.

In certain embodiments, the wearable electronic device 100 may determine whether to display virtual objects corresponding to object in the vicinity based on the user's gaze. For example, it is possible that the user is gazing at the object due to the noise that it is making. Accordingly, it would be helpful to provide virtual objects for noise cancellation.

Figure 10:
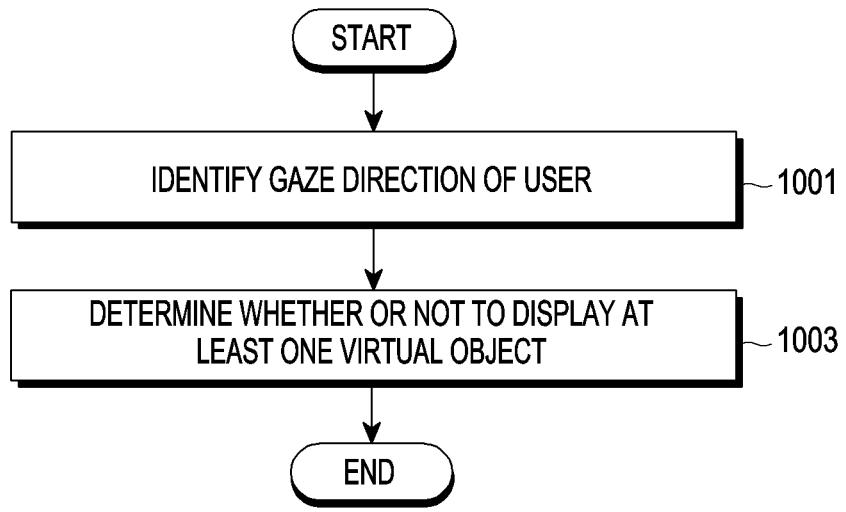
FIG. 10 is a flowchart illustrating a method of operating a wearable electronic device, according to certain embodiments.

FIG. 10 is a flowchart illustrating a method of operating a wearable electronic device, according to certain embodiments. FIG. 10 will be described with reference to FIG. 9.

Referring to FIG. 10, in operation 1001, according to certain embodiments, the wearable electronic device 100 (e.g., the processor 320) may identify a user gaze direction. For example, the wearable electronic device 100 may identify a user gaze direction by tracking the eyes of the user through at least one camera (e.g., the first camera 311, the second camera 312, and/or the third camera 313). The wearable electronic device 100 may track the eyes of the user to identify a user gaze direction toward a specific object (e.g., the first object 910) among the at least one object located in the vicinity (e.g., the first object 910 or the second object 920 in FIG. 9, or virtual objects displayed on the augmented reality screen 900 to correspond to surrounding objects identified based on surrounding environment information obtained from an external device (e.g., the external electronic device 520 and/or the server 530)).

In operation 1003, according to certain embodiments, the wearable electronic device 100 may determine whether or not to display at least one virtual object (e.g., 911 and 921 in FIG. 9), based on the user gaze direction. For example, the wearable electronic device 100 may determine to display a virtual object (e.g., first virtual object 911) corresponding to a specific object (e.g., first object 910) corresponding to the user gaze direction among the at least one object.

In this case, the wearable electronic device 100 may determine not to display a virtual object (e.g., the second virtual object 921) corresponding to at least another object (e.g., the second object 920) that does not correspond to the user gaze direction. As another example, the wearable electronic device 100 may determine not to be display a virtual object (e.g., the first virtual object 911) corresponding to a specific object (e.g., the first object 910) corresponding to the user gaze direction, among the at least one object located in the vicinity of the wearable electronic device 100. In this case, the wearable electronic device 100 may determine to display a virtual object (e.g., the second virtual object 921) corresponding to at least another object (e.g., the second object 920) that does not correspond to the user gaze direction.

In certain embodiments, the wearable electronic device 100 may determine whether to place virtual objects based on user gestures. The wearable electronic device 100 can use a camera to observe the user's body motions. For example, if the user points in one direction, the wearable electronic device 100 may determine what that the user has selected an object that is in the vicinity in the pointed direction.

Figure 11:
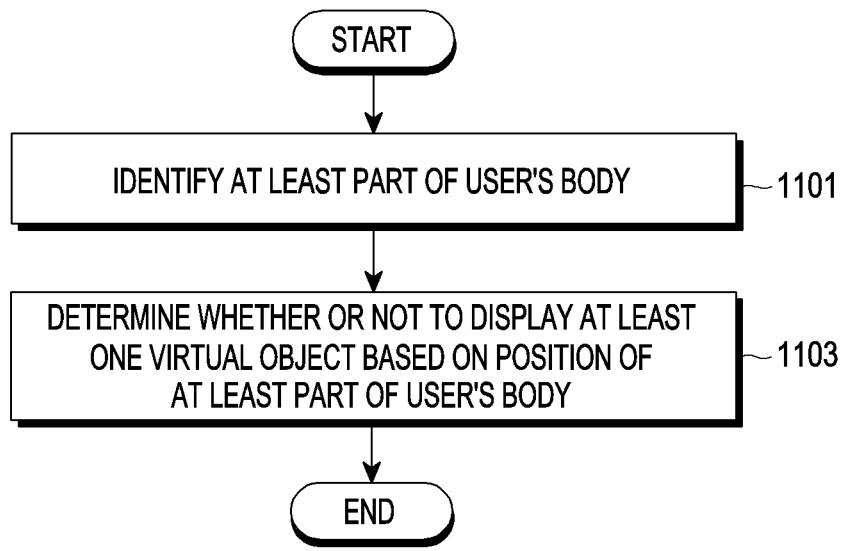
FIG. 11 is a flowchart illustrating a method of operating a wearable electronic device, according to certain embodiments.

FIG. 11 is a flowchart illustrating a method of operating a wearable electronic device, according to certain embodiments. FIG. 11 will be described with reference to FIG. 9.

Referring to FIG. 11, in operation 1101, according to certain embodiments, the wearable electronic device 100 (e.g., the processor 320) may identify at least a part of the user's body. For example, the wearable electronic device 100 may track at least a part of the user's body through at least one camera (e.g., the first camera 311, the second camera 312, and/or the third camera 313) and identify the position of at least a part of the user's body, thereby identifying a user gesture input. For example, the wearable electronic device 100 may track at least a part of the user's body to identify a user gesture input for selecting a specific object (e.g., the first object 910) from among the at least one object located in the vicinity of the wearable electronic device 100 (e.g., the first object 910 or the second object 920 in FIG. 9, or virtual objects displayed on the augmented reality screen 900 to correspond to surrounding objects identified based on surrounding environment information obtained from an external device (e.g., the external electronic device 520 and/or the server 530)).

For example, the camera (e.g., the first camera 311, the second camera 312, and/or the third camera 313) may look for the user's hands and attempt to determine whether the user is pointing in a particular direction. The wearable electronic device 100 may determine that an object that is in the particular direction is selected by the user.

In operation 1103, according to certain embodiments, the wearable electronic device 100 may determine whether or not to display at least one virtual object (e.g., 911 and 921 in FIG. 9), based on the position of at least a part of the user's body. For example, the wearable electronic device 100 may determine to display a virtual object (e.g., the first virtual object 911) corresponding to a specific object (e.g., the first object 910) corresponding to the user gesture input (e.g., corresponding to the position of at least a part of the user's body), among the at least one object located in the vicinity of the wearable electronic device 100 (e.g., the first object 910 or the second object 920 in FIG. 9, or virtual objects corresponding to surrounding objects identified based on surrounding environment information obtained from an external device (e.g., the external electronic device 520 and/or the server 530)). In this case, the wearable electronic device 100 may determine not to display a virtual object (e.g., the second virtual object 921) corresponding to at least another object (e.g., the second object 920) that does not correspond to the user gesture input (e.g., that does not correspond to the position of at least a part of the user's body).

As another example, the wearable electronic device 100 may determine not to display a virtual object (e.g., the first virtual object 911) corresponding to a specific object (e.g., the first object 910) that corresponds to the user gesture input (e.g., that corresponds to the position of at least a part of the user's body), among the at least one object located in the vicinity of the wearable electronic device 100. In this case, the wearable electronic device 100 may determine to display a virtual object (e.g., the second virtual object 921) corresponding to at least another object (e.g., the second object 920) that does not correspond to the user gesture input (e.g., that does not correspond to the position of at least a part of the user's body).

Figures 12, 13:
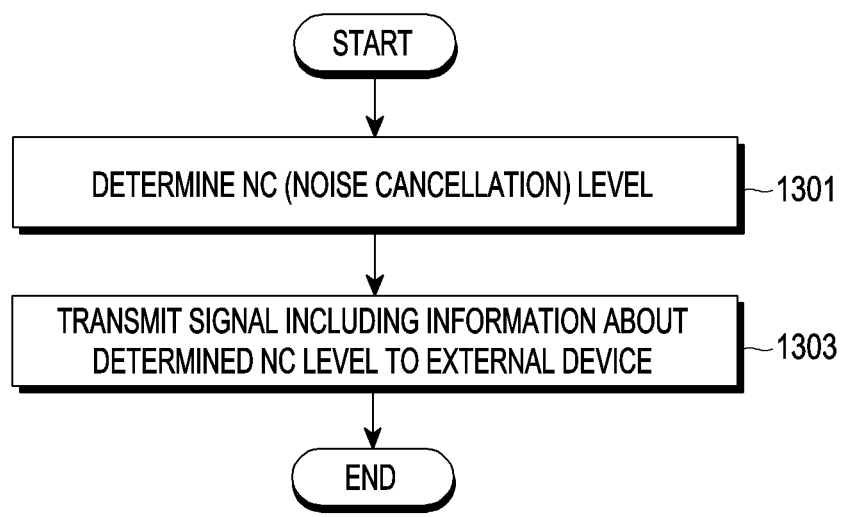
FIG. 12 is a diagram illustrating a method of operating a wearable electronic device, according to certain embodiments.
FIG. 13 is a flowchart illustrating a method of operating a wearable electronic device, according to certain embodiments.

FIG. 12 is a diagram illustrating a method of operating a wearable electronic device, according to certain embodiments.

Referring to FIG. 12, the wearable electronic device 100 (e.g., the processor 320) may determine each NC level corresponding to each operation. The levels (e.g., level 1 to level 4) in FIG. 12 are provided by way of example to classify respective operations, and are not limited. The respective operations disclosed in FIG. 12 will be described as follows.

For example, the operation of deactivating a noise cancellation (NC) function may indicate an operation of performing a function that allows the user to hear a real sound as it is, instead of performing a noise cancellation function on the real sound. For example, the wearable electronic device 100 may determine an NC level (e.g., 100) corresponding to the operation of deactivating an NC function. For example, based on a user input (e.g., a user input for deactivating a virtual object (e.g., the virtual object 912 or the virtual object 922 in FIG. 9)) to a virtual object (e.g., the virtual object 912 or the virtual object 922 in FIG. 9) corresponding to the operation of deactivating a noise cancellation function, the wearable electronic device 100 may determine the NC level of an object (e.g., the first object 910 or the second object 920 in FIG. 9).

As another example, referring to FIG. 15 or FIG. 16 to be described later, the wearable electronic device 100 may determine the NC level of the wearable electronic device 100 to be an NC level of 100) corresponding to the operation of deactivating a noise cancellation function, based on a user input to a virtual object corresponding to the hearing aid operation for all surrounding noises (e.g., the virtual object 1530 in FIG. 15 or a virtual object corresponding to the operation of deactivating a noise cancellation function included in the virtual object 1630 in FIG. 16).

In an embodiment, an operation of completely blocking noise may indicate an operation of performing a function of preventing the user from hearing a real sound by performing a noise cancellation function on the real sound. For example, the wearable electronic device 100 may determine an NC level (e.g., 0) corresponding to the operation of completely blocking noise. For example, based on a user input (e.g., a user input for activating a virtual object (e.g., the virtual object 912 or the virtual object 922 in FIG. 9)) to a virtual object (e.g., the virtual object 912 or the virtual object 922 in FIG. 9) corresponding to the operation of completely blocking noise, the wearable electronic device 100 may determine the NC level of an object (e.g., the first object 910 or the second object 920 in FIG. 9) corresponding to the virtual object corresponding to the user input to be an NC level (e.g., 0) corresponding to the operation of completely blocking noise. As another example, referring to FIG. 15 or FIG. 16 to be described later, the wearable electronic device 100 may determine an NC level of the wearable electronic device 100 to be an NC level (e.g., 0) corresponding to the operation of completely blocking noise, based on a user input to a virtual object corresponding to the operation of completely blocking all surrounding noises (e.g., the virtual object 1540 in FIG. 15 or a virtual object corresponding to the operation of completely blocking noise included in the virtual object 1630 in FIG. 16).

According to an embodiment, a volume adjustment operation may indicate an operation of adjusting the volume of a real sound that the user hears. For example, even when the relative volume of a real sound is 100, the relative volume of the real sound that the user hears may be adjusted to 1 to 99 by performing noise canceling on the real sound. For example, the wearable electronic device 100 may determine an NC level (e.g., 1 to 99) corresponding to the volume adjustment operation. For example, based on a user input to a virtual object corresponding to the volume adjustment operation (e.g., the virtual object 914 or the virtual object 924 in FIG. 9), the wearable electronic device 100 may determine the NC level of an object (e.g., the first object 910 or the second object 920 in FIG. 9) corresponding to a virtual object corresponding to the user input to be an NC level (e.g., 1 to 99) corresponding to the volume adjustment operation. As another example, referring to FIG. 15 or FIG. 16 to be described later, based on a user input to a virtual object corresponding to the volume adjustment operation for all surrounding noises (e.g., the virtual object 1550 in FIG. 15 or a virtual object corresponding to the volume adjustment operation included in the virtual object 1630 in FIG. 16), the wearable electronic device 100 may determine the NC level to be an NC level (e.g., 1 to 99) corresponding to the volume adjustment operation.

According to an embodiment, the hearing aid operation may indicate an operation in order for the user to hear a sound having a volume greater than that of a real sound. For example, sound data corresponding to a real sound may be obtained through a microphone, and the obtained sound data may be amplified and output to a speaker, so that the user can hear a sound having a volume greater than that of the real sound. For example, the wearable electronic device 100 may determine an NC level (e.g., 101 to 150) corresponding to the hearing aid operation. This means that the higher the NC level corresponding to the hearing aid operation, the greater the volume of a sound heard by the user. For example, based on a user input to a virtual object (e.g., the virtual object 914 or the virtual object 924 in FIG. 9) corresponding to the hearing aid operation, the wearable electronic device 100 may determine the NC level of an object (e.g., the first object 910 or the second object 920 in FIG. 9) corresponding to the virtual object corresponding to the user input to be an NC level (e.g., 101 to 150) corresponding to the hearing aid operation. Alternatively, for example, referring to FIG. 15 or FIG. 16 to be described later, based on a user input to a virtual object corresponding to the hearing aid operation for all surrounding noises (e.g., the virtual object 1560 in FIG. 15 or a virtual object corresponding to the hearing aid operation included in the virtual object 1630 in FIG. 16), the wearable electronic device 100 may determine the NC level of the wearable electronic device 100 to be an NC level (e.g., 101 to 150) corresponding to the hearing aid operation.

FIG. 13 is a flowchart illustrating a method of operating a wearable electronic device, according to certain embodiments.

Referring to FIG. 13, in operation 1301, according to certain embodiments, the wearable electronic device 100 (e.g., the processor 320) may determine an NC level. For example, the wearable electronic device 100, as described in operation 805 above, may determine an NC level corresponding to at least one object located in the vicinity of the wearable electronic device 100 (e.g., the first object 910 or the second object 920 in FIG. 9, or surrounding objects identified based on surrounding environment information obtained from an external device (e.g., the external electronic device 520 and/or the server 530)) (hereinafter, surrounding objects of wearable electronic device 100). As another example, as will be described later with reference to FIG. 15 and FIG. 16, the wearable electronic device 100 may determine one NC level corresponding to all surrounding objects of the wearable electronic device 100.

In operation 1303, according to certain embodiments, the wearable electronic device 100 may transmit a signal including information about the determined NC level to an external device (e.g., directly to the external wearable electronic device 410, or to the external wearable electronic device 410 through the external electronic device 520). For example, the wearable electronic device 100 may transmit a signal including information on NC levels corresponding to surrounding objects of the wearable electronic device 100 to the external wearable electronic device 410. In this case, the external wearable electronic device 410 may perform operations corresponding to the surrounding objects (e.g., the respective operations described with reference to FIG. 12), based on the NC levels corresponding to the surrounding objects. For example, the wearable electronic device 100 may transmit a first signal including information about a first NC level (e.g., 0) corresponding to the first object 910 and information about a second NC level (e.g., 100) corresponding to the second object 920 to the external wearable electronic device 410. For example, the first signal may include information indicating objects corresponding to respective NC levels. In this case, based on the respective NC levels included in the first signal, the external wearable electronic device 410 may perform an operation of deactivating a noise cancellation function on the first object 910 (e.g., an operation of performing a function that allows the user to hear a real sound as it is from the first object 910), and perform an operation of completely blocking noise on the second object 920 (e.g., an operation of performing a function of preventing the user from hearing a real sound from the second object 920 by performing a noise cancellation function on the real sound from the second object 920). As another example, the wearable electronic device 100 may transmit a signal including information about one NC level corresponding to all surrounding objects of the wearable electronic device 100 to the external wearable electronic device 410. In this case, the external wearable electronic device 410 may perform a corresponding operation (e.g., one of the operations described in FIG. 12), based on one NC level corresponding to all surrounding objects of the wearable electronic device 100. For example, the wearable electronic device 100 may transmit a second signal including information about one NC level (e.g., 50) corresponding to all surrounding objects of the wearable electronic device 100 to the external wearable electronic device 410. For example, the second signal may include information indicating that the NC level included in the second signal corresponds to all surrounding objects of the wearable electronic device 100. In this case, based on the information about the NC level (e.g., 50) included in the second signal, if the relative volume of a real sound obtained from the surrounding objects of the wearable electronic device 100 is 100, the external wearable electronic device 410 may perform noise canceling on the real sound to adjust the real sound heard by the user to 50.

Figure 14:
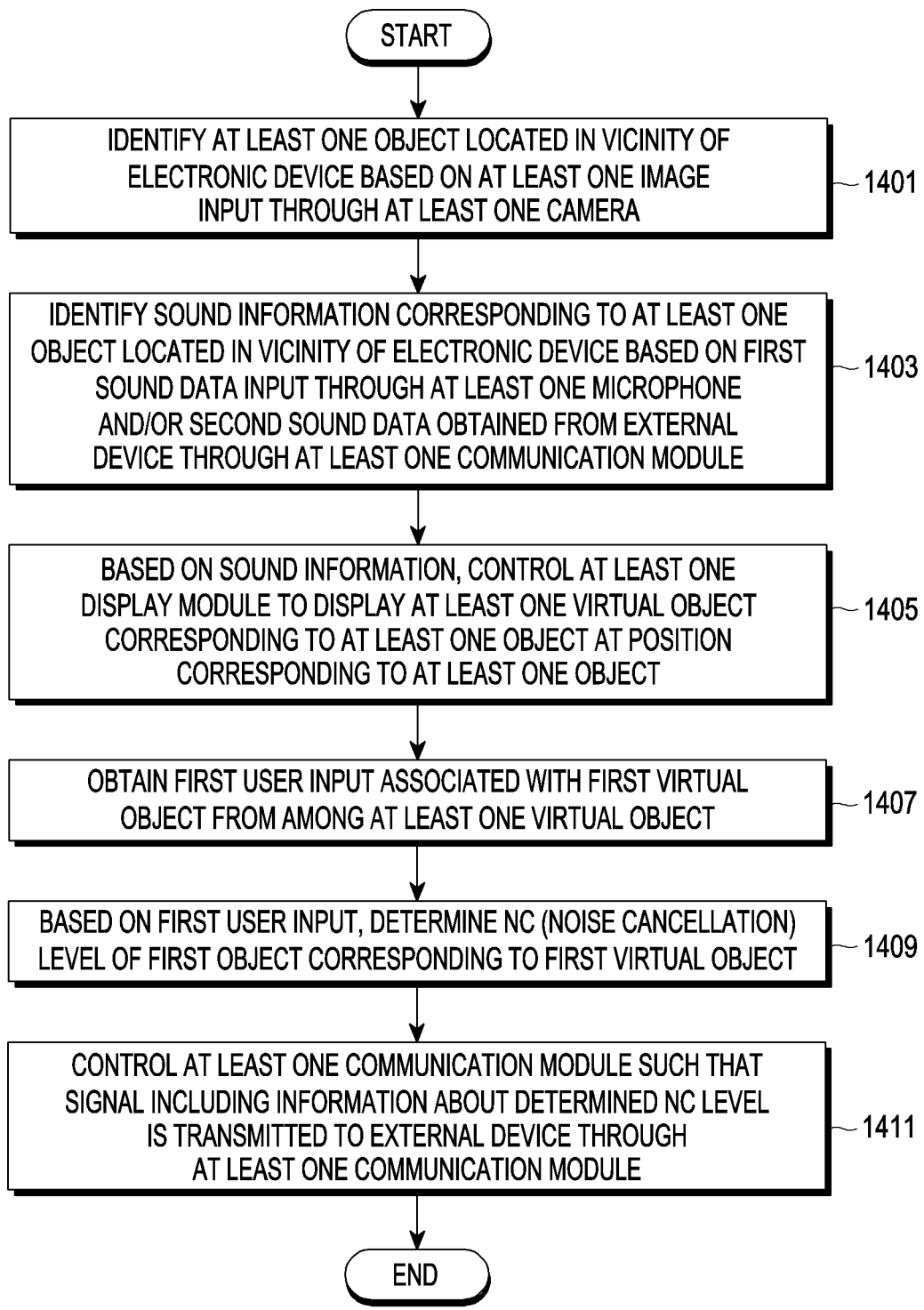
FIG. 14 is a flowchart illustrating a method of operating a wearable electronic device according to certain embodiments.

FIG. 14 is a flowchart illustrating a method of operating a wearable electronic device, according to certain embodiments. FIG. 14 will be described with reference to FIG. 3, FIG. 5, and FIG. 9.

Referring to FIG. 14, in operation 1401, according to certain embodiments, the wearable electronic device 100 (e.g., a processor (e.g., the processor 320 in FIG. 3) of the wearable electronic device 100), based on at least one image input through at least one camera (e.g., the first camera 311, the second camera 312, and/or the third camera 313 in FIG. 3), may identify at least one object (e.g., the first object 910 or the second object 920 in FIG. 9) located in the vicinity of the wearable electronic device 100. The at least one camera (e.g., the first camera 311, the second camera 312, and/or the third camera 313 in FIG. 3) may capture an image. The wearable electronic device 100 through a processor 320 can identify at least one object located in the vicinity based at least in part by recognizing the object in the image.

In operation 1403, according to certain embodiments, based on first sound data input through at least one microphone (e.g., the sound input device 362 in FIG. 3) and/or second sound data obtained from an external device (e.g., the external wearable electronic device 410 and/or the external electronic device 520) through at least one communication module (e.g., the communication module 370 in FIG. 3), the wearable electronic device 100 may identify sound information corresponding to at least one object (e.g., the first object 910 or the second object 920 in FIG. 9) located in the vicinity of the wearable electronic device 100. For example, the wearable electronic device 100 through the processor 320 may identify sound information attributable to the identified at least one object from first sound data input through the at least one microphone (e.g., the sound input device 362 in FIG. 3).

In operation 1405, according to certain embodiments, the wearable electronic device 100, based on the sound information, may control at least one display module (e.g., the display module 350 in FIG. 3) to display at least one virtual object (e.g., the first virtual object 911 and/or the second virtual object 921 in FIG. 9) corresponding to the identified at least one object at a position corresponding to the at least one object (e.g., the first object 910 or the second object 920 in FIG. 9).

In operation 1407, according to certain embodiments, the wearable electronic device 100 may obtain a first user input associated with a first virtual object (e.g., the first virtual object 911 in FIG. 9) among the at least one virtual object.

In operation 1409, according to certain embodiments, the wearable electronic device 100, based on the first user input, may determine an NC (noise cancellation) level of a first object (e.g., the first object 910 in FIG. 9) corresponding to the first virtual object (e.g., the first virtual object 911 in FIG. 9).

In operation 1411, according to certain embodiments, the wearable electronic device 100 may control at least one communication module (e.g., the communication module 370 in FIG. 3) such that a signal including information about the determined NC level is transmitted to the external device through the at least one communication module (e.g., the communication module 370 in FIG. 3) (e.g., directly to the external wearable electronic device 410, or to the external wearable electronic device 410 through the external electronic device 520).

In certain embodiments, the wearable electronic device 100 may adjust the sound output signal to the sound output device 363 in lieu of operation 1411 based on the NC determination during operation 1409.

Figure 15:
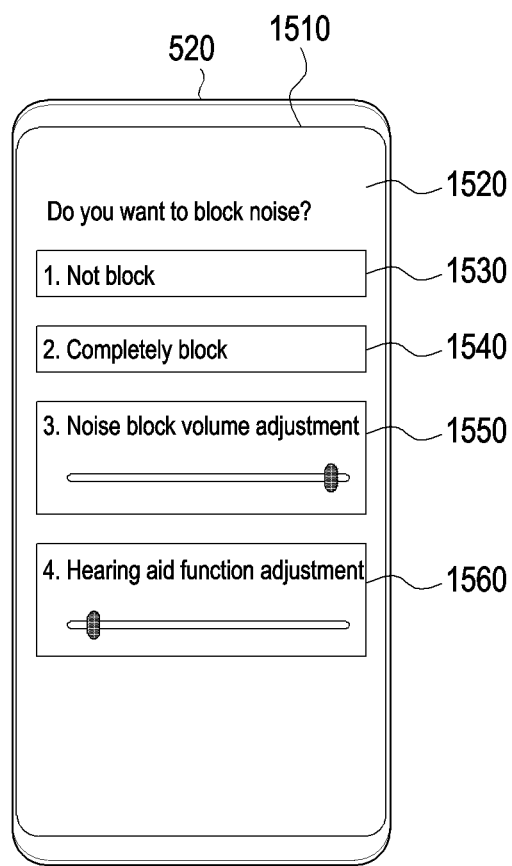
FIG. 15 is a diagram illustrating a method of operating an external electronic device, according to certain embodiments.

FIG. 15 is a diagram illustrating a method of operating an external electronic device, according to certain embodiments. FIG. 15 will be described with reference to FIG. 5 and FIG. 9.

Referring to FIG. 15, according to certain embodiments, an external electronic device 520 (e.g., a processor of the external electronic device 520) may display a screen 1520 through a display module 1510 of the external electronic device 520. For example, the screen 1520 may include an object 1530 corresponding to an operation of deactivating a noise cancellation function, an object 1540 corresponding to an operation of completely blocking noise, an object 1550 corresponding to a volume adjustment operation, and/or an object 1560 corresponding to a hearing aid operation. For example, based on sound information of at least one object located in the vicinity of the wearable electronic device 100 (e.g., the first object 910 or the second object 920 in FIG. 9, or surrounding objects identified based on surrounding environment information obtained from an external device (e.g., the external electronic device 520 and/or the server 530)), if the volume of an ambient noise is greater than or equal to a configured first volume, or is less than or equal to a configured second volume, the wearable electronic device 100 may transmit a signal to the external electronic device 520, cause the external electronic device 520 may display a screen 1520.

The wearable electronic device 100 may determine an NC level of the wearable electronic device 100, based on a user input to the screen 1520 displayed on the display module 1510 of the external electronic device 520.

Figure 16:
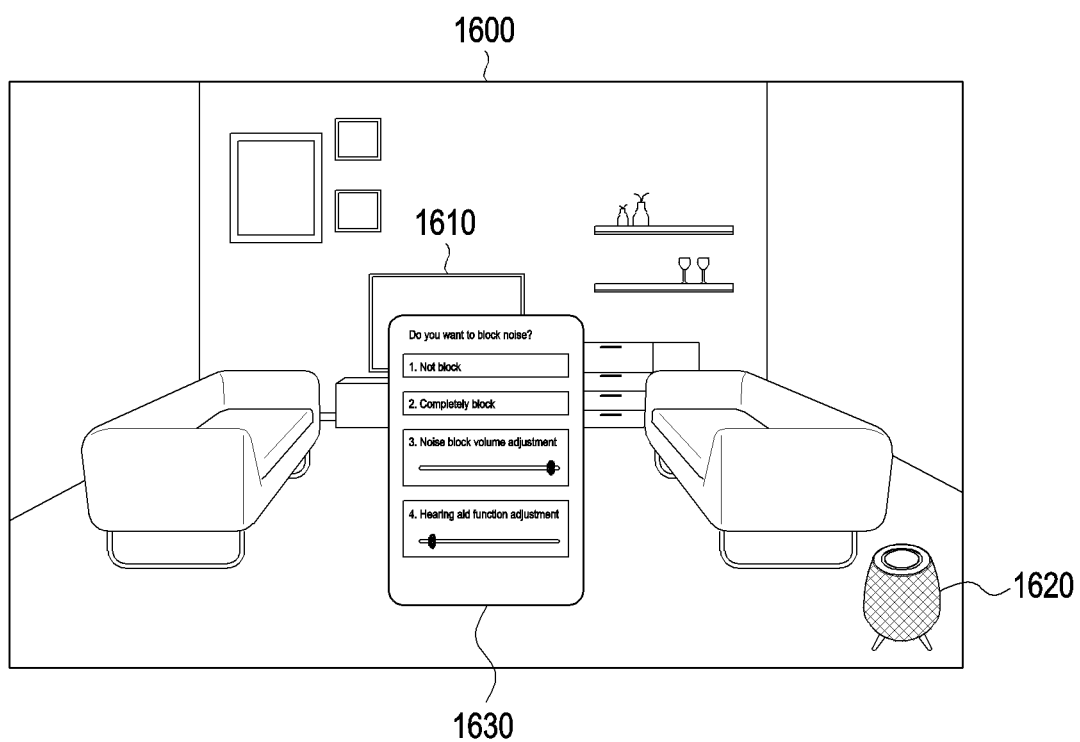
FIG. 16 is a diagram illustrating a method of operating a wearable electronic device, according to certain embodiments.

FIG. 16 is a diagram illustrating a method of operating a wearable electronic device, according to certain embodiments. FIG. 16 will be described with reference to FIG. 3.

Referring to FIG. 16, according to certain embodiments, the wearable electronic device 100 (e.g., the processor 320) may display an augmented reality screen 1600 through the display module 350. For example, the user may directly recognize at least one object located in the vicinity (e.g., a first object 1610 corresponding to a TV set and/or a second object 1620 corresponding to an external speaker) with the user's eyes while wearing the wearable electronic device 100, and the user may recognize the augmented reality screen 1600 displayed through the display module 350 of the wearable electronic device 100.

Referring to FIG. 16, according to certain embodiments, the wearable electronic device 100 may display a virtual object 1630 on the augmented reality screen 1600 through the display module 350. For example, the virtual object 1630 may include a virtual object corresponding to an operation of deactivating a noise cancellation function, a virtual object corresponding to an operation of completely blocking noise, a virtual object corresponding to a volume adjustment operation, and/or a virtual object corresponding to a hearing aid operation. For example, based on sound information of at least one object located in the vicinity of the wearable electronic device 100, if the volume of an ambient noise is greater than or equal to a configured first volume, or is less than or equal to a configured second volume, the wearable electronic device 100 may display the virtual object 1630. For example, the wearable electronic device 100 may determine an NC level of the wearable electronic device 100, based on a user input to the virtual object 1630.

It is noted that in certain embodiments, the wearable electronic device 100 may have preset settings configuring the first volume and second volume that are in places that the user frequents. For example, when the user is at their home, the wearable electronic device 100 may have settings that pre-configure based on history, the first volume and second volume of previously encountered objects.

Figure 17:
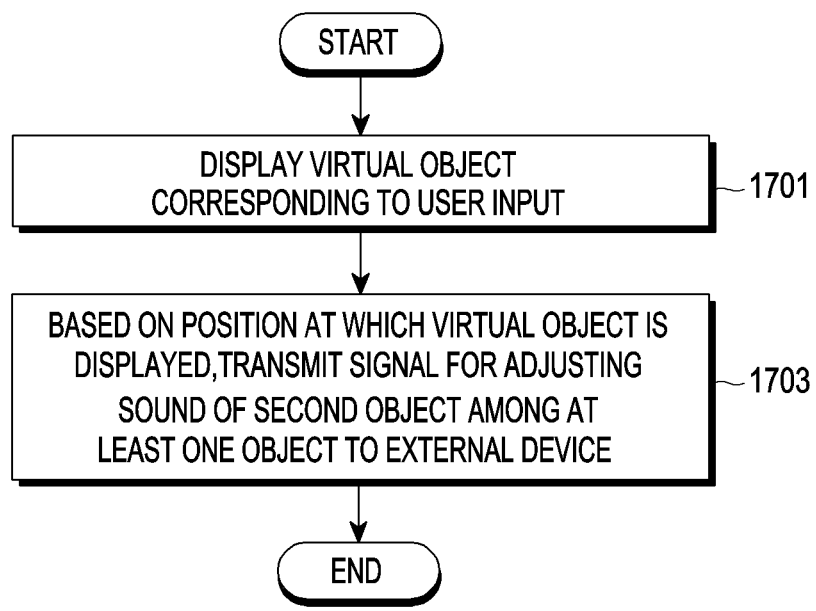
FIG. 17 is a flowchart illustrating a method of operating a wearable electronic device, according to certain embodiments.
Figure 18:
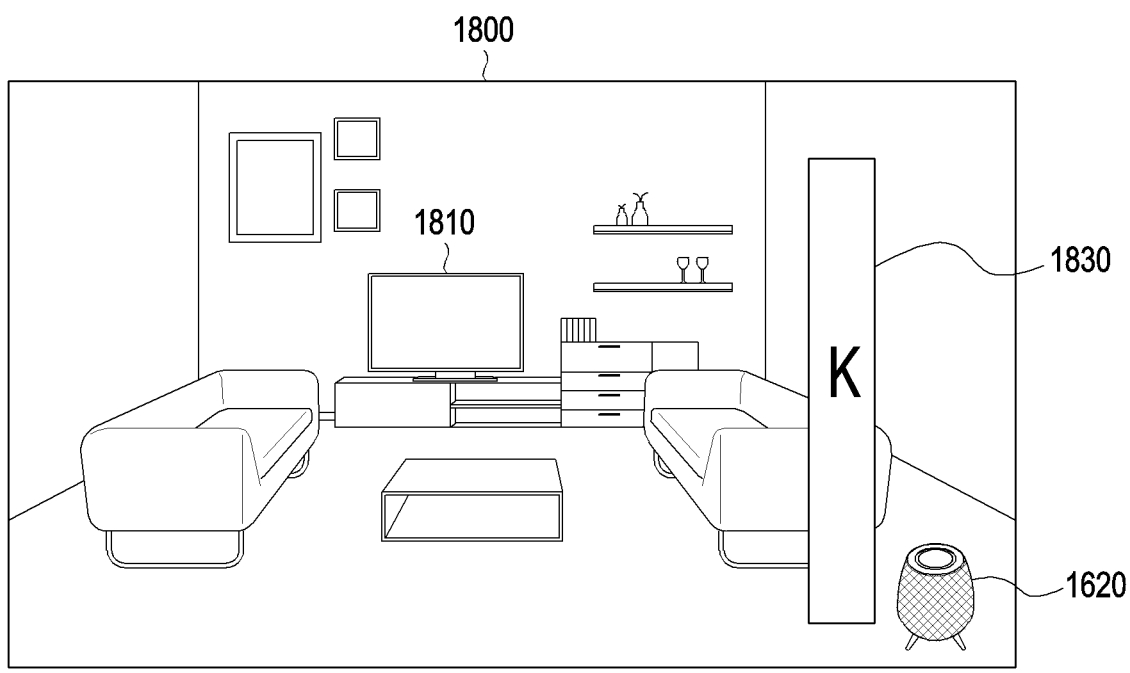
FIG. 18 is a diagram illustrating a method of operating a wearable electronic device.

FIG. 17 is a flowchart illustrating a method of operating a wearable electronic device, according to certain embodiments. FIG. 17 will be described with reference to FIG. 3 and FIG. 18. FIG. 18 is a diagram illustrating a method of operating a wearable electronic device.

It is noted that certain objects can be audio devices that have volume settings. In certain embodiments, the wearable electronic device 100 can directly control the volume of these devices through, for example, a Bluetooth or Wireless Local Area Network connection.

Referring to FIG. 17, in operation 1701, according to certain embodiments, the wearable electronic device 100 (e.g., the processor 320) may display a virtual object (e.g., a virtual object 1830) corresponding to a user input to an augmented reality screen 1800 through the display module 350. For example, the wearable electronic device 100 may obtain a user input, and display, on the augmented reality screen 1800, a virtual object 1830 corresponding to the user input (e.g., a virtual object corresponding to a virtual wall or a virtual curtain) at a position corresponding to the obtained user input. For example, in the case where the user wearing the wearable electronic device 100 and located in the living room wishes to remove the sound of an external speaker 1620 in order to hear the sound of a TV set 1810, the user may enter a user input (e.g., a user gaze input, a user utterance input, a user touch input, a user gesture input, or a user input through a separate input device) for specifying a desired position on the augmented reality screen 1800. In this case, the wearable electronic device 100 may display the virtual object 1830 at a position corresponding to the user input.

In operation 1703, according to certain embodiments, the wearable electronic device 100, based on the position at which the virtual object (e.g., the virtual object 1830) is displayed, may transmit a signal for adjusting the sound of a specific object (e.g., the second object 1620 located beyond the virtual object 1830 from the wearable electronic device 100) to an external device (e.g., directly to the external wearable electronic device 410, or to the external wearable electronic device 410 through the external electronic device 520). For example, the signal for adjusting the sound of a specific object, which is transmitted from the wearable electronic device 100 to the external wearable electronic device 410, may indicate a signal including information on the display position of the virtual object 1830 and/or information (e.g., position information of the second object 1620) indicating a specific object (e.g., the second object 1620) located beyond the virtual object 1830. In this case, the wearable electronic device 100 may transmit a signal for adjusting the sound of a specific object (e.g., the second object 1620) to the external wearable electronic device 410, and the external wearable electronic device 410, based on the information on the display position of the virtual object 1830 and/or information (e.g., position information of the second object 1620) indicating a specific object (e.g., the second object 1620) located beyond the virtual object 1830, which are included in the signal received from the wearable electronic device 100, may perform noise canceling by generating the opposite wave signal of the wave of the real sound from the specific object (e.g., the second object 1620).

According to certain embodiments, based on a user input, the wearable electronic device 100, in operation 1701 described above, may display the virtual object 1830 in the form of a virtual wall or a virtual curtain corresponding to the user input. For example, in the case where the virtual object 1830 is displayed in the shape of a virtual wall or a virtual curtain, the wearable electronic device 100 may determine a method of adjusting a sound of a specific object (e.g., the second object 1620 positioned beyond the virtual object 1830 from the wearable electronic device 100), based on properties configured to correspond to the virtual object 1830 (e.g., the thickness, transparency, physical properties (e.g., water, metal, or concrete material) and/or volume of the virtual wall (or virtual curtain) selected in response to a user input). For example, if the physical property of the virtual object 1830 displayed in response to a user input is water, the wearable electronic device 100 may determine a sound adjustment method of the second object 1620, thereby providing an effect as if the user hears the sound under the water. As another example, if the virtual object 1830 displayed in response to a user input is a virtual curtain, the wearable electronic device 100 may determine the degree of noise canceling for the sound of the second object 1620 to be lower than that in the case where the virtual object 1830 is a virtual wall, thereby increasing the relative volume of the sound heard by the user from the second object 1620 compared to the case where the virtual object 1830 is a virtual wall. The method of determining an adjustment method of a sound from a specific object is exemplary, and there is no limitation thereto.

Figure 19:
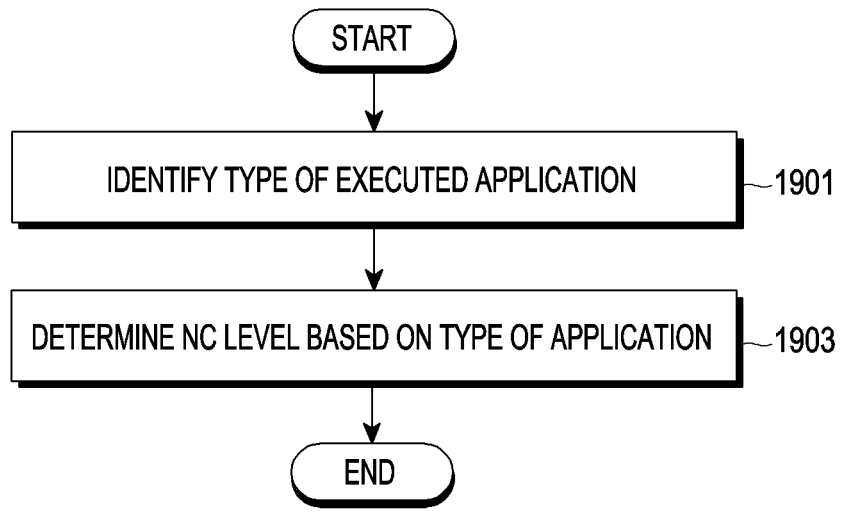
FIG. 19 is a flowchart illustrating a method of operating a wearable electronic device, according to certain embodiments.

FIG. 19 is a flowchart illustrating a method of operating a wearable electronic device, according to certain embodiments.

Referring to FIG. 19, in operation 1901, according to certain embodiments, the wearable electronic device 100 (e.g., the processor 320) may identify the type of an application executed in the wearable electronic device 100.

In operation 1903, according to certain embodiments, the wearable electronic device 100 may determine an NC level of the wearable electronic device 100, based on the type of the application executed in the wearable electronic device 100. For example, when a movie watching application is executed, the wearable electronic device 100 may determine the NC level of the wearable electronic device 100 to be an NC level (e.g., 100) corresponding to the operation of completely blocking noise. For example, when an augmented reality conference application is executed, the wearable electronic device 100 may determine the NC level of the wearable electronic device 100 to be an NC level (e.g., 1 to 99) corresponding to the volume adjustment operation. For example, when a hearing aid application is executed, the wearable electronic device 100 may determine the NC level of the wearable electronic device 100 to be an NC level (e.g., 101 to 150) corresponding to the hearing aid operation. The type of the executed application and the NC level corresponding thereto are exemplary, and there is no limitation thereto.

Figure 20:
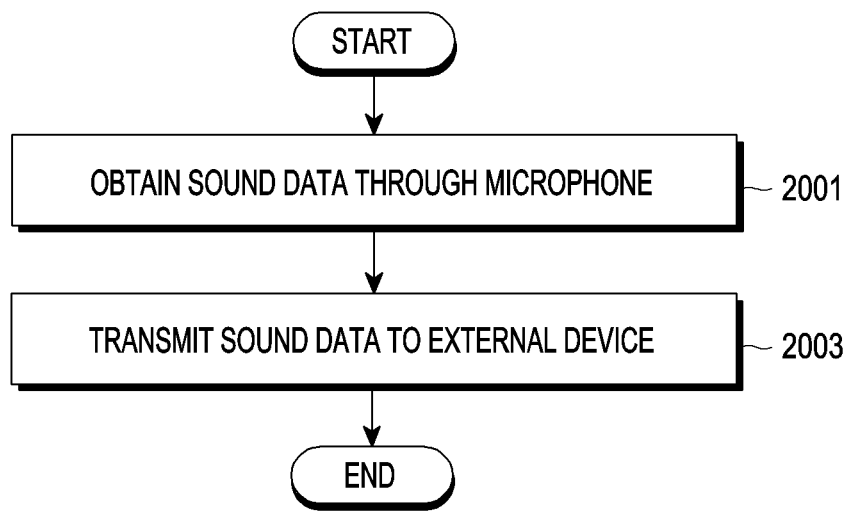
FIG. 20 is a flowchart illustrating a method of operating a wearable electronic device, according to certain embodiments.
Figure 21:
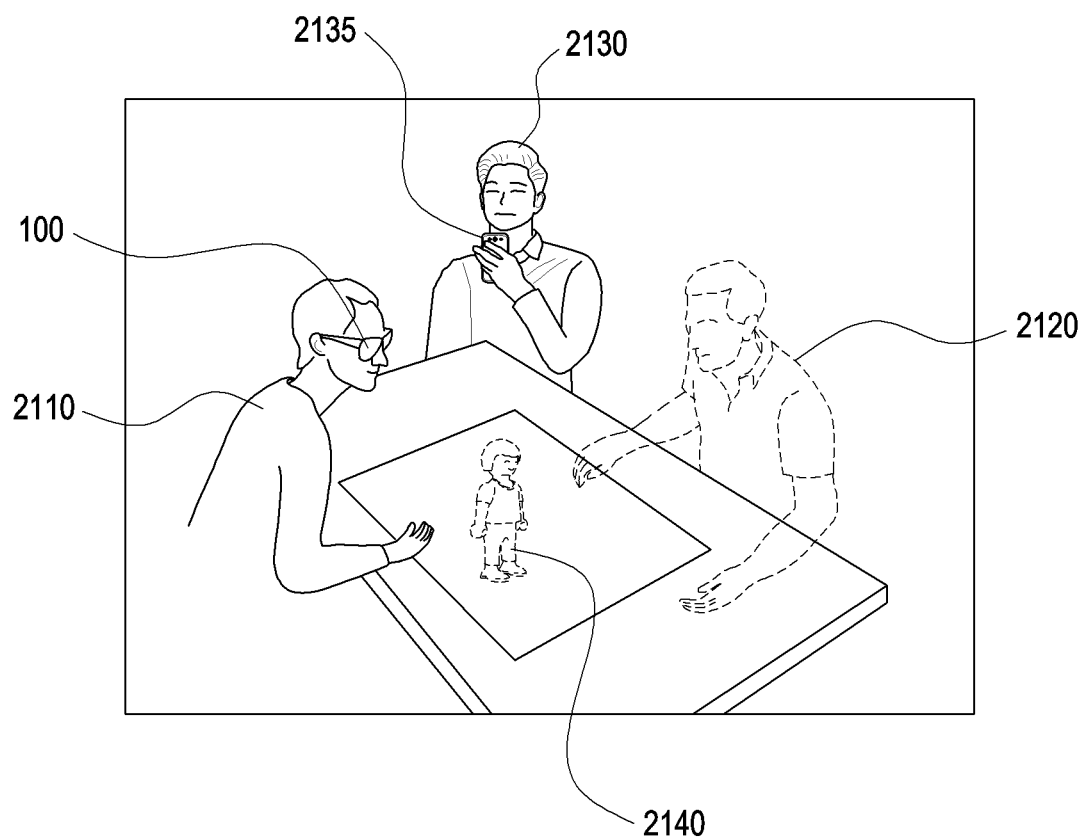
FIG. 21 is a diagram illustrating a method of operating a wearable electronic device.

FIG. 20 is a flowchart illustrating a method of operating a wearable electronic device, according to certain embodiments. FIG. 20 will be described with reference to FIG. 21. FIG. 21 is a diagram illustrating a method of operating a wearable electronic device.

Referring to FIG. 20, in operation 2001, according to certain embodiments, the wearable electronic device 100 (e.g., the processor (e.g., the processor 320 in FIG. 3) of the wearable electronic device 100) may obtain sound data input through at least one microphone (e.g., the sound input device 362 in FIG. 3). For example, the wearable electronic device 100 may obtain sound data corresponding to a sound from at least one object located in the vicinity of the wearable electronic device 100 (e.g., a person 2130 located in the vicinity) and/or sound data corresponding to a sound from a user 2110 wearing the wearable electronic device 100. For example, referring to FIG. 21, the wearable electronic device 100 may obtain sound data corresponding to a sound from the person 2130 who exists in the vicinity of the wearable electronic device 100 and/or the user 2110 wearing the wearable electronic device 100 during an augmented reality meeting.

Figure 22:
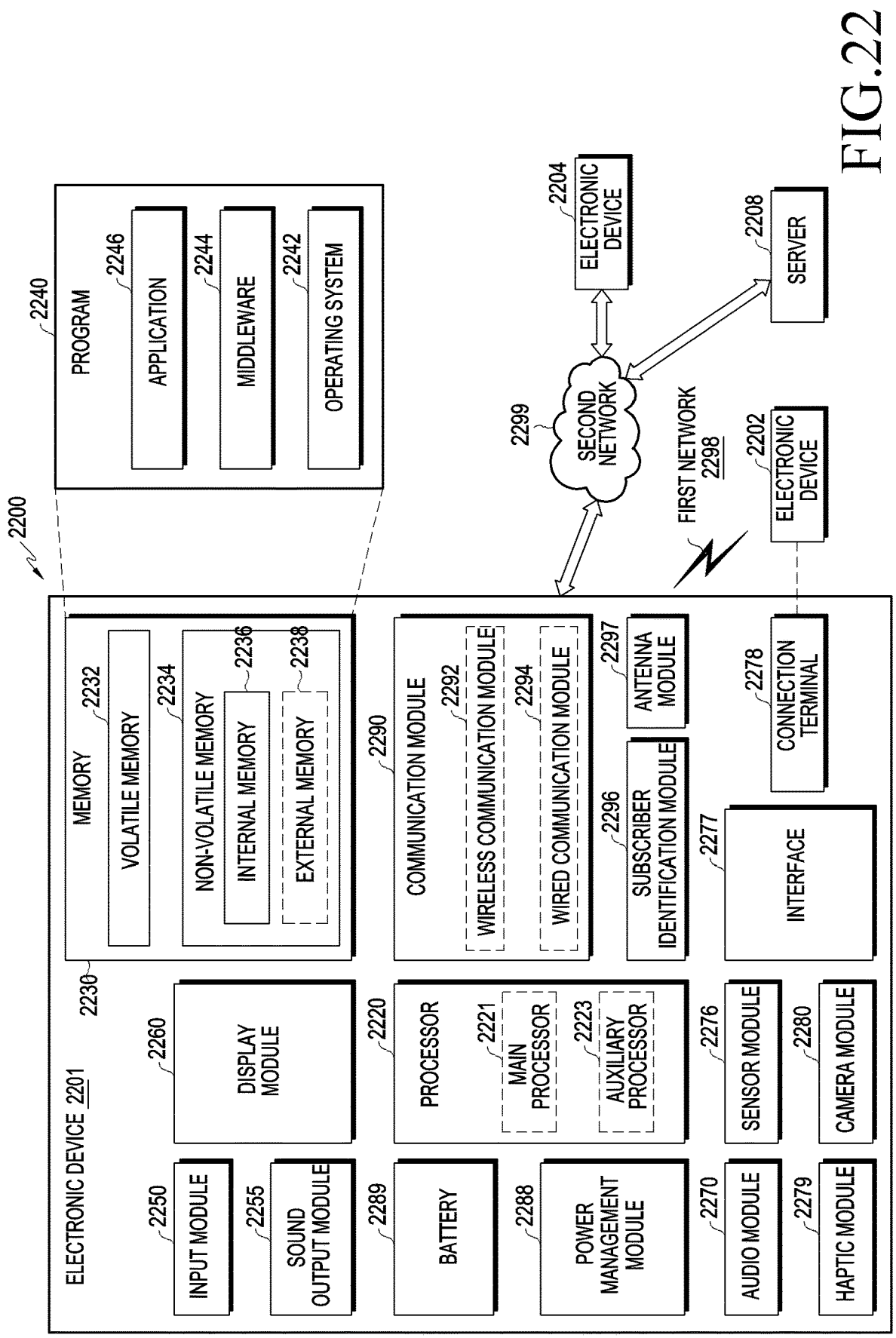
FIG. 22 is a block diagram of an electronic device in a network environment, according to certain embodiments.

In operation 2003, according to certain embodiments, the wearable electronic device 100 may transmit sound data input through at least one microphone (e.g., the sound input device 362 in FIG. 3) to an external device, and, at this time, transmission to an external device may indicate, for example, that the wearable electronic device 100 may transmit sound data input through at least one microphone (e.g., the sound input device 362 in FIG. 3) to an external wearable electronic device (e.g., the external wearable electronic device 410 in FIG. 5) worn by the user 2110 wearing the wearable electronic device 100 and/or an electronic device of another user (e.g., another user 2120) (e.g., the wearable electronic device worn by another user (e.g., the same type of electronic device as the external wearable electronic device 410 in FIG. 5), or the electronic device 2202, the electronic device 2204, or the server 2208 in FIG. 22). For example, referring to FIG. 21, the wearable electronic device 100 may transmit sound data input through at least one microphone (e.g., the sound input device 362 in FIG. 3) to an external device (e.g., an external wearable electronic device (e.g., the external wearable electronic device 410 in FIG. 4) worn by the user 2110 wearing the wearable electronic device 100 and/or an electronic device of another user (e.g., another user 2120) (e.g., the wearable electronic device worn by another user (e.g., the same type of electronic device as the external wearable electronic device 410 in FIG. 4), or the electronic device 2202, the electronic device 2204, or the server 2208 in FIG. 22)) during the augmented reality meeting. At this time, for example, the wearable electronic device 100 may transmit, to the external device, only sound data corresponding to a sound from the user 2110 wearing the wearable electronic device 100, among the sound data input through at least one microphone of the wearable electronic device 100 (e.g., the sound input device 362 in FIG. 3), instead of transmitting sound data corresponding to a sound from the person 2130 existing in the vicinity of the wearable electronic device 100 to the external device. Accordingly, the user 2110 wearing the wearable electronic device 100 and/or another user 2120 who does not exist in the vicinity of the wearable electronic device 100 but participates in the augmented reality meeting may hear some of the sound data input through at least one microphone (e.g., the sound input device 362 in FIG. 3) of the wearable electronic device 100. As another example, it may be understood by those skilled in the art that the wearable electronic device 100 may transmit both the sound data corresponding to a sound from the person 2130 existing in the vicinity of the wearable electronic device 100 and the sound data corresponding to a sound from the user 2110 wearing the wearable electronic device 100 to the external device (e.g., an external wearable electronic device (e.g., the external wearable electronic device 410 in FIG. 4) worn by the user 2110 wearing the wearable electronic device 100 and/or an electronic device of another user (e.g., another user 2120) (e.g., the wearable electronic device worn by another user (e.g., the same type of electronic device as the external wearable electronic device 410 in FIG. 4), or the electronic device 2202, the electronic device 2204, or the server 2208 in FIG. 22)).

Hereinafter, at least one configuration of the electronic device will be described in more detail with reference to FIG. 22. In FIG. 22, the electronic device 2201 may indicate the external electronic device 520 in FIG. 5. In FIG. 22, the electronic device 2202 may indicate the wearable electronic device 100 and/or the external wearable electronic device 410 in FIG. 5. In FIG. 22, the server 2208 may indicate the server 530 in FIG. 5. Alternatively, the wearable electronic device 100, the external wearable electronic device 410, and/or the server 530 in FIG. 5 may be implemented as the same type of electronic device as the electronic device 2201 in FIG. 22.

FIG. 22 is a block diagram illustrating an electronic device in a network environment according to certain embodiments. Referring to FIG. 22, the electronic device 2201 in the network environment 2200 may communicate with an electronic device 2202 via a first network 2298 (e.g., a short-range wireless communication network), or an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one of the components (e.g., the connecting terminal 2278) may be omitted from the electronic device 2201, or one or more other components may be added in the electronic device 2201. In some embodiments, some of the components (e.g., the sensor module 2276, the camera module 2280, or the antenna module 2297) may be implemented as a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation.

According to one embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control, for example, at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active (e.g., executing an application) state. According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by another component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the display, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or an external electronic device (e.g., an electronic device 2202 (e.g., a speaker or a headphone)) directly or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, an HDMI connector, a USB connector, an SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device 2204 via the first network 2298 (e.g., a short-range communication network, such as Bluetooth™, wireless-fidelity (Wi-Fi) direct, or infrared data association (IrDA)) or the second network 2299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify or authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element composed of a conductive material or a conductive pattern formed in or on a substrate (e.g., a printed circuit board (PCB)). According to an embodiment, the antenna module 2297 may include a plurality of antennas (e.g., array antennas). In such a case, at least one antenna appropriate for a communication scheme used in the communication network, such as the first network 2298 or the second network 2299, may be selected, for example, by the communication module 2290 from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

The antenna module 2297 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the external electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or healthcare) based on 5G communication technology or IoT-related technology.

According to certain embodiments, an electronic device 100 may include: at least one display module (e.g., the display module 350 in FIG. 3); at least one communication module (e.g., the communication module 370 in FIG. 3); at least one microphone (e.g., the sound input device 390 in FIG. 3); at least one camera (e.g., the first camera 311, the second camera 312, and/or the third camera 313 in FIG. 3); and a processor 320, wherein the processor may be configured capture at least one image through the at least one camera, to identify at least one object located around the electronic device, based at least in part on the at least one image, identify sound information attributable to the identified at least one object from first sound data input through the at least one microphone, control the at least one display module to display at least one virtual object corresponding to the identified at least one object at a position corresponding to the at least one object, wherein the position is determined based on the sound information, obtain a first user input associated with a first virtual object among the at least one virtual object, and determine a noise cancellation (NC) level of a first object corresponding to the first virtual object, based on the first user input.

According to certain embodiments, the processor may be configured to identify the at least one object, based at least in part on surrounding environment information obtained through the at least one communication module.

According to certain embodiments, the processor may be configured to determine whether or not to display the first virtual object, based on volume of sound included in first sound information corresponding to the first object.

According to certain embodiments, the processor may be configured to identify a gaze direction of a user of the electronic device using the at least one camera, and determine whether or not to display the at least one virtual object, based on the gaze direction.

According to certain embodiments, the processor may be configured to identify at least a part of a body of a user of the electronic device using the at least one camera, and determine whether or not to display the at least one virtual object, based on a position of the at least the part of the body of the user.

According to certain embodiments, the processor may be configured to control the at least one display module to display a second virtual object (e.g., the virtual object 1830 in FIG. 18) corresponding to a second user input through the at least one display module, and control the at least one communication module to transmit, to the external device, a signal for adjusting a sound of a second object (e.g., the second object 1620 located beyond the virtual object 1830 from the wearable electronic device 100) among the at least one object, based on a position at which the second virtual object is displayed.

According to certain embodiments, the processor may be configured to determine a method of adjusting a sound of the second object, based on a predetermined property corresponding to the second virtual object.

According to certain embodiments, the processor may be configured to identify a type of an application executed in the electronic device and determine the NC level, based on the type of the application.

According to certain embodiments, the processor may be configured to control the at least one communication module to transmit the first sound data input through the at least one microphone to the external device.

According to certain embodiments, the processor may be configured to receive second sound data from an external device through the at least one communication module and wherein identifying sound information attributable to the identified at least one object from the first sound data is based at least in part on the second sound data.

According to certain embodiments, the processor may be configured to control the at least one communication module to transmit a signal including information about the determined NC level to the external device through the at least one communication module.

According to certain embodiments, a method of operating an electronic device 100 may include capturing at least one image through at least one camera of the electronic device (e.g., the first camera 311, the second camera 312, and/or the third camera 313 in FIG. 3), identifying at least one object located around the electronic device, based at least in part on the at least one image, identifying sound information attributable to the identified at least one object from first sound data input through at least one microphone (e.g., the sound input device 390 in FIG. 3) of the electronic device, displaying at least one virtual object corresponding to the at least one object at a position corresponding to the identified at least one object through at least one display module (e.g., the display module 350 in FIG. 3) of the electronic device, wherein the position is determined based on the sound information, obtaining a first user input associated with a first virtual object among the at least one virtual object, and determining a noise cancellation (NC) level of a first object corresponding to the first virtual object, based on the first user input.

According to certain embodiments, the identifying of the at least one object may include identifying the at least one object located around the electronic device, based on the at least one image input through the at least one camera and surrounding environment information obtained through the at least one communication module.

According to certain embodiments, the method may further include determining whether or not to display the first virtual object, based on volume of sound included in first sound information corresponding to the first object.

According to certain embodiments, the method may further include identifying a gaze direction of a user of the electronic device using the at least one camera, and determining whether or not to display the at least one virtual object, based on the gaze direction.

According to certain embodiments, the method may further include identifying at least a part of a body of a user of the electronic device using the at least one camera, and determining whether or not to display the at least one virtual object, based on a position of the at least the part of the body of the user.

According to certain embodiments, the method may further include displaying a second virtual object (e.g., the virtual object 1830 in FIG. 18) corresponding to a second user input through the at least one display module, and transmitting, to the external device, a signal for adjusting a sound of a second object (e.g., the second object 1620 located beyond the virtual object 1830 from the wearable electronic device 100) among the at least one object through the at least one communication module, based on a position at which the second virtual object is displayed.

According to certain embodiments, the method may further include determining a method of adjusting a sound of the second object, based on a predetermined property corresponding to the second virtual object.

According to certain embodiments, the method may further include identifying a type of an application executed in the electronic device, and determining the NC level, based on the type of the application.

According to certain embodiments, the method may further include transmitting the first sound data input through the at least one microphone to the external device through the at least one communication module.

According to certain embodiments, the method further comprises receiving second sound data from an external device through at least one communication module and wherein identifying sound information attributable to the identified at least one object from the first sound data is based at least in part on the second sound data.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   at least one display module;
   at least one communication module;
   at least one microphone;
   at least one camera;
   at least one processor; and
   memory storing instructions that, when executed by the at least one processor cause the electronic device to:
   capture at least one image through the at least one camera,
   identify at least one object located around the electronic device, based at least in part on the at least one image, obtain first sound data input through the at least one microphone, wherein the first sound data includes sound from a first object and a second object, based on the first sound data, identify a first sound forming a portion of the first sound data that is associated with the first object. and a second sound forming another portion of the first sound data associated with the second object, control the at least one display module to display a first virtual object corresponding to the first object to determine a noise cancellation (NC) level corresponding to the first object, and a second virtual object corresponding to the second object to determine a noise cancellation (NC) level corresponding to the second object, obtain a first user input associated with the first virtual object, and based on the first user input, determine the NC level for adjusting the first sound forming the portion of the first sound data.

2. The electronic device of claim 1, wherein the instructions, when executed by the at least one processor, cause the electronic device to identify the first object and the second object, based at least in part on surrounding environment information obtained through the at least one communication module.

3. The electronic device of claim 1, wherein the instructions, when executed by the at least one processor, cause the electronic device to determine whether or not to display the first virtual object, based on volume of the first sound corresponding to the first object.

4. The electronic device of claim 1, wherein the instructions, when executed by the at least one processor, cause the electronic device to identify a gaze direction of a user of the electronic device using the at least one camera, and determine whether or not to display the first virtual object and the second virtual object, based on the gaze direction.

5. The electronic device of claim 1, wherein the instructions, when executed by the at least one processor, cause the electronic device to identify at least a part of a body of a user of the electronic device using the at least one camera, and determine whether or not to display the first virtual object and the second virtual object, based on a position of the at least the part of the body of the user.

6. The electronic device of claim 1, wherein the instructions, when executed by the at least one processor, cause the electronic device to:

identify a second user input, control the at least one display module to display the second virtual object corresponding to the second user input, and control the at least one communication module to transmit, to an external device, a signal for adjusting a sound of the second object among the at least one object, based on a position at which the second virtual object is displayed.

7. The electronic device of claim 6, wherein the instructions, when executed by the at least one processor, cause the electronic device to determine a method of adjusting the second sound, based on a predetermined property corresponding to the second virtual object.

8. The electronic device of claim 1, wherein the instructions, when executed by the at least one processor, cause the electronic device to identify a type of an application executed in the electronic device and determine the NC level, based on the type of the application.

9. The electronic device of claim 1, wherein the instructions, when executed by the at least one processor, cause the electronic device to control the at least one communication module to transmit the first sound data input through the at least one microphone to an external device.

10. The electronic device of claim 1, wherein the instructions, when executed by the at least one processor, cause the electronic device to receive second sound data from an external device through the at least one communication module and wherein identifying the first sound corresponding to the first object and the second sound corresponding to the second object is based at least in part on the second sound data.

11. The electronic device of claim 10, wherein the instructions. when executed by the at least one processor, cause the electronic device to control the at least one communication module to transmit a signal including information about the determined NC level to the external device through the at least one communication module.

12. A method of operating an electronic device, the method comprising:

capturing at least one image through at least one camera of the electronic device, identifying at least one object located around the electronic device, based at least in part on the at least one image, obtaining first sound data input through at least one microphone, wherein the first sound data includes sound from a first object and a second object, based on the first sound data, identifying a first sound forming a portion of the first sound data that is associated with the first object, and a second sound forming another portion of the first sound data associated with the second object, displaying a first virtual object corresponding to the first object to determine a noise cancellation (NC) level corresponding to the first object, and a second virtual object corresponding to the second object to determine a noise cancellation (NC) level corresponding to the second object, obtaining a first user input associated with the first virtual object, and based on the first user input, determining the (NC) level for adjusting the first sound forming the portion of the first sound data.

13. The method of claim 12, wherein the identifying of the first object and the second object comprises identifying the at least one object located around the electronic device, based at least in part on surrounding environment information obtained through at least one communication module of the electronic device.

14. The method of claim 12, further comprising determining whether or not to display the first virtual object, based on volume of the first sound corresponding to the first object.

15. The method of claim 12, further comprising identifying a gaze direction of a user of the electronic device using the at least one camera, and determining whether or not to display the first virtual object and the second virtual object, based on the gaze direction.

16. The method of claim 12, further comprising identifying at least a part of a body of a user of the electronic device using the at least one camera, and determining whether or not to display the first virtual object and the second virtual object, based on a position of the at least the part of the body of the user.

17. The method of claim 12, further comprising identifying a second user input, displaying a second virtual object corresponding to the second user input, and transmitting, to an external device, a signal for adjusting the second sound through at least one communication module, based on a position at which the second virtual object is displayed.

18. The method of claim 17, further comprising determining a method of adjusting the second sound, based on a predetermined property corresponding to the second virtual object.

19. The method of claim 12, further comprising identifying a type of an application executed in the electronic device, and determining the NC level, based on the type of the application.

20. The method of claim 12, further comprising transmitting the first sound data input through the at least one microphone to an external device through at least one communication module of the electronic device.

\* \* \* \* \*